(12) United States Patent
Lau et al.

(10) Patent No.: US 10,805,523 B2
(45) Date of Patent: Oct. 13, 2020

(54) ARTICLE AUTHENTICATION APPARATUS HAVING A BUILT-IN LIGHT EMITTING DEVICE AND CAMERA

(71) Applicant: EASY PRINTING NETWORK LIMITED, Kwun Tong, Kowloon (HK)

(72) Inventors: Tak Wai Lau, Kowloon (HK); Wing Hong Lam, Kowloon (HK)

(73) Assignee: EASY PRINTING NETWORK LIMITED, Hong Kong (HK)

( * ) Notice: Subject to any disclaimer, the term of this patent is extended or adjusted under 35 U.S.C. 154(b) by 0 days.

(21) Appl. No.: 15/969,582

(22) Filed: May 2, 2018

(65) Prior Publication Data

US 2018/0249070 A1 Aug. 30, 2018

Related U.S. Application Data

(63) Continuation-in-part of application No. 14/404,564, filed as application No. PCT/IB2013/054463 on May 30, 2013, now abandoned.

(30) Foreign Application Priority Data

| May 30, 2012 | (HK) | ................................. | 12105265.3 |
| Aug. 10, 2012 | (HK) | ................................. | 12107864.4 |
| Jan. 21, 2013 | (HK) | ................................. | 13100895.1 |

(51) Int. Cl.
*H04N 5/232* (2006.01)
*H04N 5/225* (2006.01)
(Continued)

(52) U.S. Cl.
CPC ......... *H04N 5/23222* (2013.01); *G06F 21/34* (2013.01); *G06T 1/005* (2013.01);
(Continued)

(58) Field of Classification Search
None
See application file for complete search history.

(56) References Cited

U.S. PATENT DOCUMENTS

| 2004/0014490 | A1* | 1/2004 | Muramatsu | .............. G06K 7/14 455/550.1 |
| 2006/0088166 | A1* | 4/2006 | Karusawa | ............. H04L 9/3226 380/277 |

(Continued)

OTHER PUBLICATIONS

Title: QR Code Web: https://web.archive.org/web/20120315013243/ http://en.wikipedia.org/wiki/QR_Code Date: Mar. 15, 2012 (Year: 2012).*

*Primary Examiner* — Twyler L Haskins
*Assistant Examiner* — Wesley J Chiu

(57) ABSTRACT

An apparatus comprises an image capturing device, a light emitting device for illuminating an object to be captured by the image capturing device, a visual guide to guide a user to aim the apparatus at a target authentication device, and a processor. The visual guide is devised such that when the apparatus is aimed at the target authentication device following guidance of the visual guide, the brightness levels on an image of the target authentication device captured by the image capturing device while under illumination of the light emitting device are within a predetermined range of brightness levels to facilitate verification of authenticity with reference to the captured image of the target authentication device.

20 Claims, 14 Drawing Sheets

(51) Int. Cl.
  *G06T 1/00* (2006.01)
  *H04N 5/235* (2006.01)
  *G06F 21/34* (2013.01)
  *H04N 17/00* (2006.01)

(52) U.S. Cl.
  CPC ......... *G06T 1/0021* (2013.01); *H04N 5/2256* (2013.01); *H04N 5/2351* (2013.01); *H04N 5/2354* (2013.01); *H04N 5/23293* (2013.01); *H04N 5/232935* (2018.08); *H04N 5/232939* (2018.08); *H04N 17/002* (2013.01); *G06T 2201/0051* (2013.01); *G06T 2201/0065* (2013.01); *G06T 2201/0202* (2013.01)

(56) References Cited

U.S. PATENT DOCUMENTS

| | | | | |
|---|---|---|---|---|
| 2007/0091322 A1* | 4/2007 | Tano | | G06K 7/14 356/610 |
| 2007/0131770 A1* | 6/2007 | Nunnink | | G06K 7/10732 235/454 |
| 2007/0262235 A1* | 11/2007 | Pertsel | | H04N 5/2354 250/208.1 |
| 2008/0039063 A1* | 2/2008 | Ichieda | | H04L 67/04 455/420 |
| 2008/0253608 A1* | 10/2008 | Long | | G06K 7/14 382/100 |
| 2008/0296390 A1* | 12/2008 | Dudek | | G06K 19/06009 235/469 |
| 2009/0212113 A1* | 8/2009 | Chiu | | G06K 7/14 235/462.41 |
| 2011/0101086 A1* | 5/2011 | Yach | | G06Q 10/10 235/375 |
| 2012/0000982 A1* | 1/2012 | Gao | | G06K 7/146 235/455 |
| 2012/0173347 A1* | 7/2012 | De Almeida Neves | | G06K 7/10722 705/16 |
| 2013/0140356 A1* | 6/2013 | Fan | | G06K 7/1452 235/375 |
| 2013/0176465 A1* | 7/2013 | Sumisaki | | H04N 5/2354 348/241 |
| 2013/0228619 A1* | 9/2013 | Soborski | | G06K 19/06056 235/437 |
| 2013/0234850 A1* | 9/2013 | Lee | | A61B 5/681 340/539.12 |
| 2014/0158769 A1* | 6/2014 | Powell | | G06K 7/10811 235/462.06 |
| 2015/0379321 A1* | 12/2015 | Soborski | | G06Q 30/0185 235/375 |
| 2016/0188941 A1* | 6/2016 | Todeschini | | G06K 7/1443 235/462.11 |
| 2016/0321531 A1* | 11/2016 | Lau | | G06K 19/06037 |

* cited by examiner

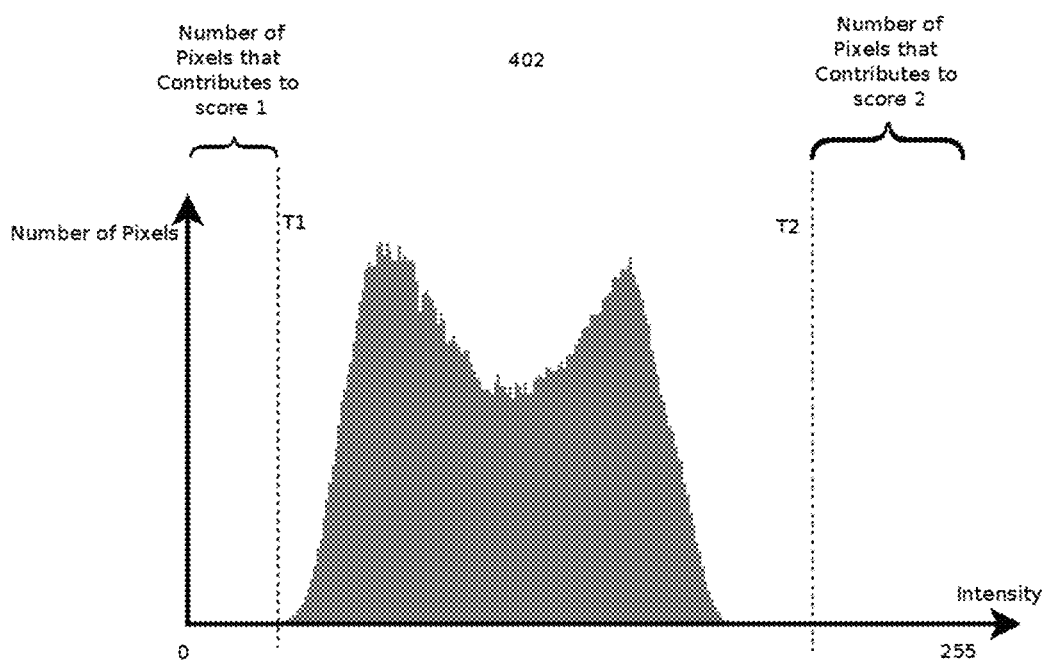
Fig. 4
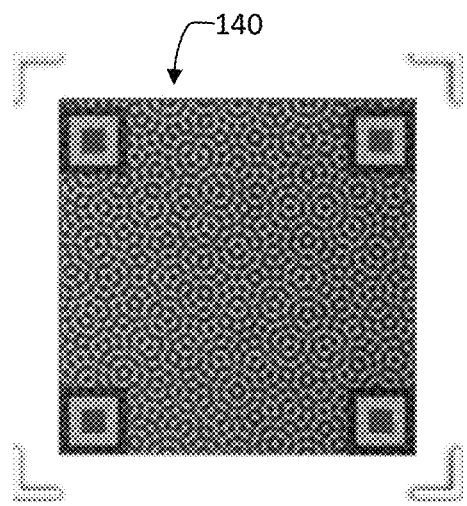
Fig. 4A
Fig. 4B
Brightness Requirement:
score 1 = Total Number of Pixels With Intensity Below T1
score 2 = Total Number of Pixels With Intensity Above T2
score 1 < Th1 and score 2 < Th2
score 1 < Th1 and score 2 < Th2
↓
Brightness Requirement is Met

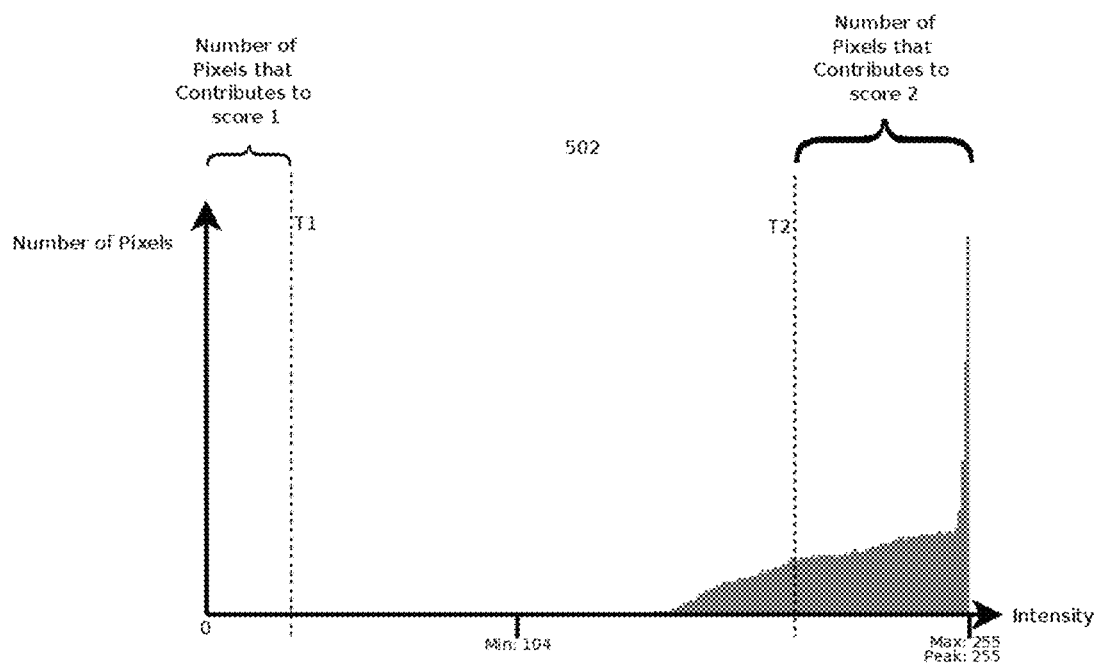
Fig. 5
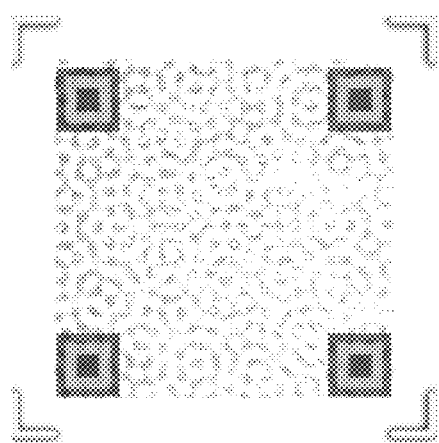
Fig. 5A
Fig. 5B

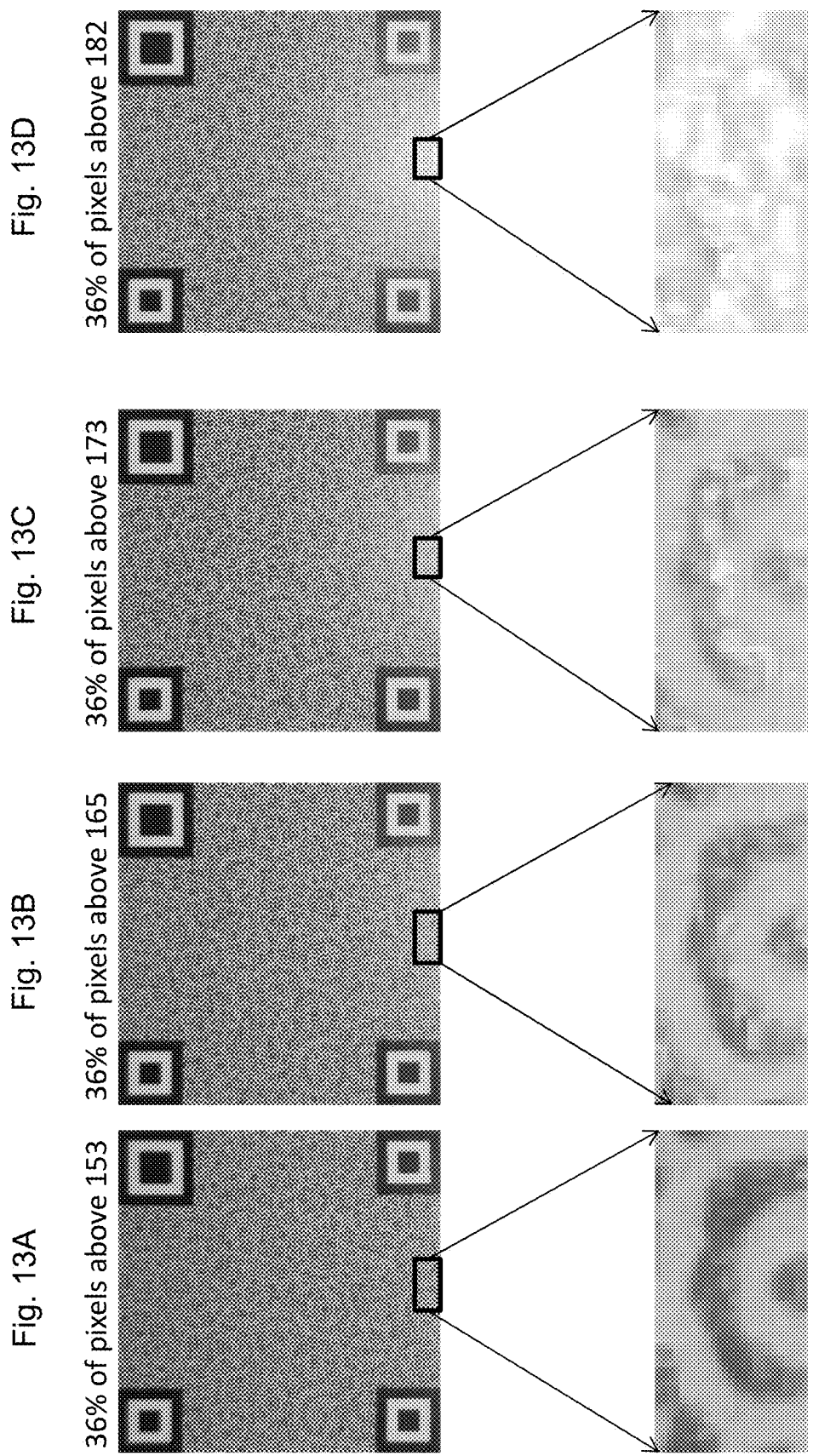

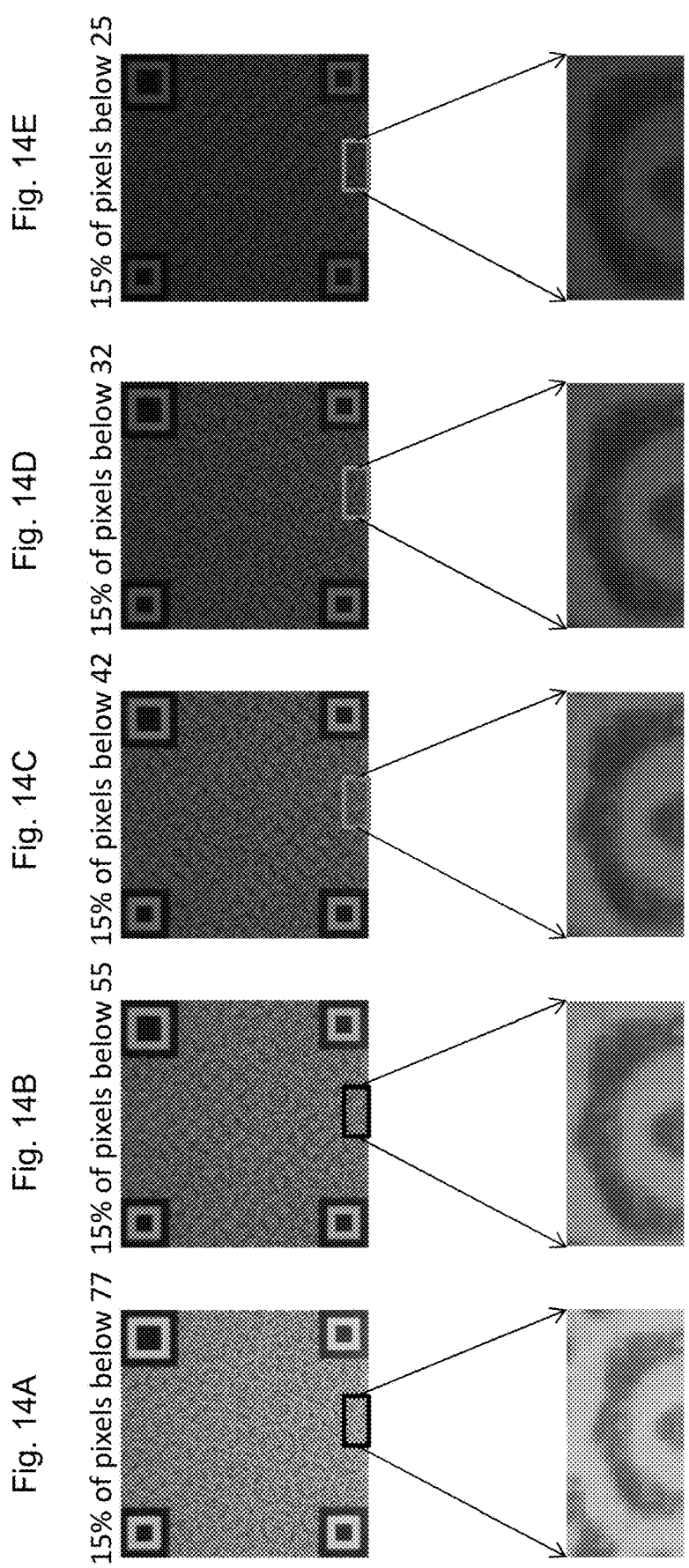

ARTICLE AUTHENTICATION APPARATUS HAVING A BUILT-IN LIGHT EMITTING DEVICE AND CAMERA

This is a continuation-in-part application of U.S. Ser. No. 14/404,564 (now abandoned) which is a US national phase entry of PCT/IB2013/054463 filed on Nov. 28, 2014.

Counterfeiting is a serious problem which not only disrupts normal commercial or non-commercial activities but also poses safety as well as security issues to the general public. Many types of anti-counterfeiting measures are dedicated to help fight counterfeiting. For example, genuine goods carry authentication devices such as authentication tags or codes to help verify authenticity of goods or products. However, even such authentication tags or codes can become the subject of rampant counterfeiting and enhanced security measures to combat counterfeiting are desirable.

High precision authentication devices such as those comprising digitally coded security patterns are very useful in combating counterfeiting because digitally coded information subsisting in the security patterns are very sensitive and are difficult to counterfeit. The moiré pattern is a good example of authentication devices comprising digitally coded security patterns which has been widely used to enhance reliability of authentication devices. The term 'authentication device' in the present context generally means authentication device for use in combating counterfeiting.

While authentication devices comprising digitally coded security patterns such as moiré or moiré-type patterns are very useful in the combat of counterfeits, the highly precise and delicate nature of the security patterns mean that a high-fidelity reproduction of the security patterns is often needed to facilitate reliable authentication.

Many modern mobile electronic devices such as mobile phones, smart phones, tablet computers, or notebook computers have built-in digital cameras and should be useful for taking an image of an authentication device for verification of authenticity. However, trials show that the quality of images of authentication devices taken by such mobile electronic devices is not satisfactory enough to facilitate authentication applications.

It would be advantageous if an improved authentication apparatus and/or improved image capturing method are provided such that a high-fidelity image of an authentication device can be obtained.

An authentication apparatus for verifying authenticity of a target authentication device is disclosed. The target authentication device comprising security features to facilitate verification of authenticity and the apparatus comprising an image capturing device for capturing an image of a target authentication device, a light emitting device for projecting supplemental illumination along an axis of light projection and towards the target authentication device during image capture operations when supplemental illumination is required or activated, a display device including a display screen, a visual guide on the display device, and a processor.

In some embodiments, the visual guide includes an alignment device for guiding a user to position the image capturing device at a selected target relative position to the target authentication device such that when an image of the target authentication device appearing on the display device is aligned with the alignment device and captured under supplemental illumination by the light emitting device to produce a captured image of the target authentication device, the captured image has a quality of fidelity greater than a predetermined fidelity threshold and a quantity of captured image pixel data greater than a quantity of pixels required to fully and accurately represent the target authentication device. The predetermined fidelity threshold is satisfied when the quantity of captured image pixel data exceeding an overexposure threshold is not greater than a first threshold count, when the quantity of captured image pixel data below an underexposure threshold is not greater than a second threshold count, and when the quantity of captured image pixel data having brightness levels between the overexposure threshold and the underexposure threshold is of a sufficient amount to facilitate making of decision to verify authenticity of the target authentication device, and the target relative position is a preselected one of a plurality of available relative positions between the image capturing device and the target authentication device permitting capture of an image of the target authentication device having a sufficient data quantity while the image is being displayed on the display device, and the available relative positions include relative positions between the image capturing device and the target authentication device which are under different supplemental illumination conditions and which would result in unacceptable quality of fidelity due to overexposure and/or underexposure when an image of the target authentication device is captured under the supplemental illumination.

In some embodiments, the apparatus has an elongate housing which extends along a longitudinal axis, and the display screen and the light emitting device are on opposite major sides of the elongate housing such that the housing is between the target authentication device and the display screen during normal image capture operations.

In some embodiments, the light emitting device is to project light at an acute angle to the longitudinal axis during image capture operations when supplemental illumination is provided by the light emitting device.

In some embodiments, the plurality of available relative positions between the image capturing device and the target authentication device permitting capture of an image of the target authentication device having sufficient data quantity while being displayed on the display device corresponds to a plurality of relative positions of acceptable and unacceptable supplemental illumination conditions.

In some embodiments, the target relative position is one having acceptable supplemental illumination conditions selected among the plurality of available relative positions of acceptable and unacceptable supplemental illumination conditions.

In some embodiments, the apparatus is a smart phone operable to execute stored instructions to capture an image of the target authentication device for subsequent verification of authenticity.

In some embodiments, the display screen which extends along a longitudinal direction and the image capturing device is arranged such that when the image capturing device is moved away from the target authentication device in the longitudinal direction with size of the image of the target authentication device appearing on the display screen remains unchanged after an image of the target authentication device appearing on the display device has been aligned with the alignment device, the image of the target authentication device appearing on the display screen also moves away from the alignment device in the longitudinal direction into relative positions of unacceptable supplemental illumination conditions.

In some embodiments, the apparatus has an elongate housing extending along a longitudinal axis and the axis of light projection is at an acute angle to the longitudinal axis;

and the alignment device defines an alignment window appearing on a selected portion of a display screen of the display device such that when an image of the target authentication device appears in alignment with the alignment device, the axis of light projection falls outside the security features of the target authentication device.

In some embodiments, the apparatus has a housing extending along a longitudinal axis and the axis of light projection is at an acute angle to the longitudinal axis; and the target authentication device and the axis of light projection does not intercept when at the target relative position, and/or when the axis of light projection intercepts the target authentication device, an image of the target authentication device captured under the supplemental illumination would have an unacceptable quality of fidelity due to overexposure.

In some embodiments, the target relative position is a relative position having a more even distribution of supplemental illumination brightness on the target authentication device where there is a plurality of relative positions meeting a sufficient quality of fidelity.

In some embodiments, a selected portion of the target authentication device comprises critical data necessary for authentication and the alignment device defines the selected portion.

A method of calibrating a reference smartphone for capturing image of an authentication device for subsequent verification of authenticity for subsequent use by same or compatible smart phones is disclosed. The smartphone comprising an image capturing device, a light emitting device for projecting supplemental illumination along an axis of light projection to a target authentication device during image capture operations when supplemental illumination is required, a display device having a display screen and a processor.

In some embodiments, the method comprises identifying a target relative position between the image capturing device and a reference authentication device, the target relative position being one that would produce an image of the reference authentication device having a quality of fidelity greater than a predetermined fidelity threshold and a quantity of captured image pixel data greater than a quantity of pixels required to fully and accurately represent the target authentication device when the image of the reference authentication device is captured at the target relative position while under supplemental illumination of the light emitting device; the predetermined fidelity threshold is satisfied when the quantity of captured image pixel data exceeding an overexposure threshold is not greater than a threshold count, when the quantity of captured image pixel data below an underexposure threshold is not greater than a threshold count, and when the quantity of captured image pixel data having brightness levels between the overexposure threshold and the underexposure threshold is of a sufficient amount to facilitate making of decision to verify authenticity of the target authentication device, and devising an alignment device on the display screen to correspond to the target relative position for guiding a user to capture an image of a target authentication device during normal use.

In some embodiments, the target relative position is a selected one of a plurality of available relative positions between the image capturing device and the target authentication device permitting capture of an image of the target authentication device having a sufficient data quantity while the image is being displayed on the display device, and the available relative positions include relative positions between the image capturing device and the target authentication device which are under different supplemental illumination conditions and which would result in unacceptable quality of fidelity due to overexposure and/or underexposure when an image of the target authentication device is captured under the supplemental illumination.

In some embodiments, the method comprises capturing images of the reference authentication device at different relative positions between the image capturing device and a reference authentication device to identify the target relative position.

the method comprises selecting a relative position having a more even distribution of supplemental illumination brightness on the target authentication device as the target relative position where there is a plurality of relative positions satisfying a sufficient quality of fidelity.

In some embodiments, the method comprises analyzing pixel brightness distribution of the captured images or analyzing authentication data fidelity recovered from the captured images to identify the target relative position.

A method of verifying authenticity of a target authentication device using an authentication apparatus is disclosed. The authentication apparatus comprising an image capturing device for capturing an image of a target authentication device, a light emitting device for projecting supplemental illumination along an axis of light projection towards the target authentication device during image capture operations when supplemental illumination is required or activated, a display device, and a processor.

In some embodiments, the method includes devising a visual guide on the display device, the visual guide comprising an alignment device for guiding a user to position the image capturing device at a selected target relative position to the target authentication device such that when an image of the target authentication device appearing on the display device is aligned with the alignment device and captured under supplemental illumination by the light emitting device to produce a captured image of the target authentication device, the captured image has a quality of fidelity greater than a predetermined threshold and a quantity of captured image pixel data greater than a quantity of pixels required to fully and accurately represent the target authentication device; the predetermined fidelity threshold is satisfied when the quantity of captured image pixel data exceeding an overexposure threshold is not greater than a threshold count, when the quantity of captured image pixel data below an underexposure threshold is not greater than a threshold count, and when the quantity of captured image pixel data having brightness levels between the overexposure threshold and the underexposure threshold is of a sufficient amount to facilitate making of decision to verify authenticity of the target authentication device; and the target relative position is a preselected one of a plurality of available relative positions between the image capturing device and the target authentication device permitting capture of an image of the target authentication device having a sufficient data quantity while the image is being displayed on the display device, and the available relative positions include relative positions between the image capturing device and the target authentication device which are under different supplemental illumination conditions and which would result in unacceptable quality of fidelity due to overexposure and/or underexposure when an image of the target authentication device is captured under the supplemental illumination.

In some embodiments, the plurality of available relative positions between the image capturing device and the target authentication device permitting capture of an image of the target authentication device having sufficient data quantity while being displayed on the display device corresponds to a plurality of relative positions of acceptable and unacceptable supplemental illumination conditions, and the method comprises selecting a target relative position having acceptable supplemental illumination conditions among the plurality of available relative positions of acceptable and unacceptable supplemental illumination conditions.

In some embodiments, the apparatus has an elongate housing extending along a longitudinal axis and the axis of light projection is at an acute angle to the longitudinal axis; and the method comprises defining an alignment window on a selected portion of a display screen of the display device such that when an image of the target authentication device appears in alignment with the alignment device, the axis of light projection falls outside the security features of the target authentication device.

In some embodiments, the method comprises selecting a relative position which has a more even distribution of supplemental illumination brightness on the target authentication device as the target relative position when there is a plurality of relative positions meeting a sufficient quality of fidelity.

In some embodiments, the method includes devising the alignment device for alignment with a selected portion of the target authentication device which contains critical data necessary for authentication.

In some embodiments, the method includes devising the alignment device on a selected portion of the display screen to correspond to the target relative position.

DESCRIPTION OF FIGURES

The disclosure will be described by way of non-limiting example with reference to the accompanying Figures, in which:—

FIG. 4 is a schematic representation depicting an example distribution of pixel brightness levels of a first captured image of the example authentication device taken by the example authentication apparatus at the relative position as depicted in FIGS. 2A and 3A, FIG. 4A depicts a copy of the first example captured image of the example authentication device, FIG. 4B depicts an example decision flow to determine acceptability of the first captured image, FIG. 5 is a schematic representation depicting an example distribution of pixel brightness levels of a second captured image of the example authentication device taken by the example authentication apparatus at the relative position as depicted in FIGS. 2B and 3B, FIG. 5A depicts a copy of the example second captured image of the example authentication device, FIG. 5B depicts an example decision flow to determine acceptability of the second captured image, FIGS. 13A, 13B, 13C, 13D are images of an authentic target data bearing image pattern captured under different illumination conditions with different or increasing percentage of pixels having brightness levels above an upper brightness level T2, FIGS. 13A1, 13B1, 13C1 and 13D1 are enlarged views of the spatial feature components which define the higher frequency definitive components of FIG. 13A to 13D, FIGS. 14A, 14B, 14C, 14D and 14E are images of an authentic target data bearing image pattern captured under different illumination conditions with different or increasing percentage of pixels having brightness levels below an upper brightness level T1, FIGS. 14A1, 14B1, 14C1, 14D1 and 14E1 are enlarged views of the spatial feature components which define the higher frequency definitive components of FIG. 14A to 14E.

DESCRIPTION

Figure 1:
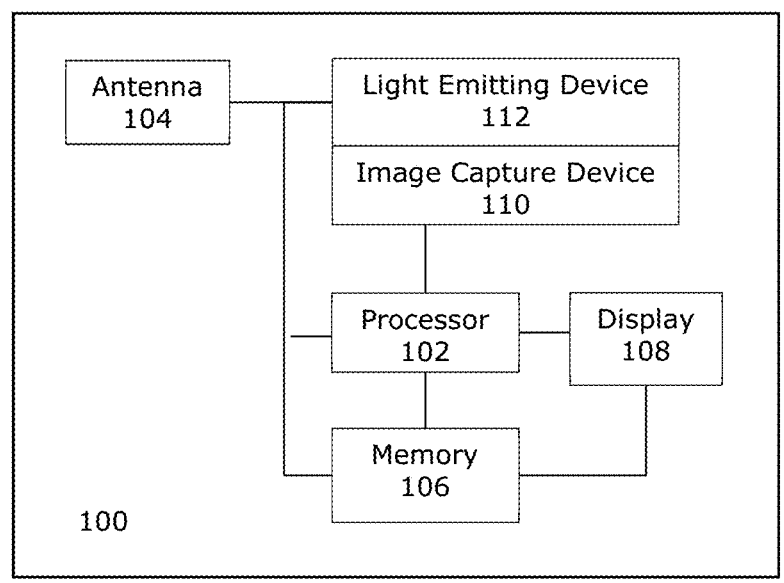
FIG. 1 is functional block diagram of an example apparatus suitable for operation as an authentication apparatus according to the present disclosure.

There is disclosed an authentication image capturing method for use with an apparatus comprising an image capturing device, a light emitting device to project light for illuminating an object to be captured by the image capturing device, and a processor. The authentication image capturing method may be part of an authentication method for verifying authenticity of a target authentication device containing security features such as digitally coded security features. Therefore, the authentication image capturing method is also an authentication method.

The authentication method includes devising a visual guide for guiding a user to aim the apparatus at a target authentication device on execution of an authentication process such that when the apparatus is aimed at the target authentication device following guidance of the visual guide to capture an image of the target authentication device, the content and quality of fidelity of the captured image is sufficient to facilitate verification of authenticity of the target authentication device.

The visual guide may be devised such that when the apparatus is aimed at the target authentication device so that an alignment device on the visual guide is aligned with a corresponding alignment device on the target authentication device, an image of the target authentication device thus captured will result in an image having a sufficient content to facilitate verification of authentication. A sufficient content in the present context means that the quantity of image data of the target authentication device is sufficient to make decision on authenticity of the target authentication device. The dimension and shape of the visual guide is designed to capture a sufficient content.

The visual guide may be devised such that when the apparatus is aimed at the target authentication device so that the alignment device on the visual guide is aligned with the corresponding alignment device on the target authentication device, an image of the target authentication device thus captured will result in an image having a sufficient quality of fidelity to facilitate verification of authentication. A sufficient quality of fidelity in the present context means the captured image of the target authentication device contains a collection of image data which is a sufficiently true, accurate or correct representation of the target authentication device to facilitate making of determination on the authenticity of the target authentication device.

The visual guide may be devised empirically using a reference apparatus and a reference sample of the target authentication device (the 'reference authentication device'). For example, the visual guide may be devised by taking sample images of the reference authentication device at different relative locations between the image capturing device and the reference authentication device which meets the content requirement while under illumination of the light emitting device and to select a relative location which generates a correct authentication result as the visual guide. A correct authentication result would mean that the requirement on the quality of fidelity on the image data is satisfied. It will be appreciated that the relative locations will be represented by images shown on different portion of the display of the reference apparatus without loss of generality. Where there is more than one location which gives a correct authentication result, the relative location that gives an image that best satisfies predetermined brightness thresholds is selected to set the visual guide. For example, the relative location maybe one corresponding to where the sample image has a more even distribution of pixel intensity will be selected as the location to set the visual guide. In an example, where there is more than one location which gives a correct authentication result, the relative location which is furthest away from locations where the quality of image data fidelity is not satisfied is selected as the relative location to set the visual guide, The visual guide may be devised using image processing techniques. For example, a sample authentication device having the same digitally coded features arranged in the same manner as the target authentication device but extend over the entire image capturing region of the image capturing device may be used as a calibration sample to calibrate the reference apparatus to set the visual guide. As the same digitally coded features are arranged in the same manner as the target authentication device, the same light reflection and distortion properties can be expected. An extended image of the sample authentication device which is taken by having the sample authentication device covering the entire image capturing region of the image capturing device while under illumination of the light emitting device and meeting the content requirement would mean that calibration can be done with respect to a single extended image of the sample authentication device.

The reference authentication device or the sample authentication device may be used as a calibration sample to set a visual guide meeting the fidelity requirements.

In calibration operation, an operator will aim the apparatus at the calibration sample and capture an image of the calibration sample while under operational illumination of the light emitting device. The digital data embedded in the captured image of the calibration sample are then recovered and analysed by the processor or manually to examine the quality of fidelity of the digitally data embedded in the captured image. The visual guide will be set at a region where the quality of fidelity satisfies a predetermined fidelity threshold. Where the region can accommodate more than one visual guide, the visual guide may be selectively set at a region where the brightness levels of pixels associated with the captured sample image can best satisfy predetermined brightness thresholds. In the description herein, the terms 'fidelity', 'truthfulness', 'correctness', 'accuracy' and the respective adjectives will be interchangeably used when the context so permits or requires.

In an example, the method includes devising the visual guide such that brightness levels on an image of the calibration sample which was captured by the image capturing device while under operational illumination of the light emitting device are within a predetermined range of brightness levels suitable for verification of authenticity. The range of predetermined threshold brightness levels may be selected to be a range within which the quality of the captured image of the calibration sample is sufficient to facilitate verification of authenticity. The resolution of a captured image is an aspect of quality which relates to factors affecting verification of authenticity.

The predetermined range of brightness levels may include an upper brightness threshold level and/or a lower brightness threshold level. The upper brightness threshold level may be set at a level above which there is a good likelihood that the image has been distorted by over-illumination. For example, the upper threshold brightness level may be set near the maximum intensity level available to the pixels. The maximum intensity corresponds to brightness saturation such that further increase in brightness at the calibration sample will not increase the intensity level at the pixels. The lower brightness threshold level may be set at a level below which there is a good likelihood that the image has been distorted by under-illumination. For example, the lower threshold brightness level may be set near the minimum intensity level available to the pixels. The minimum intensity corresponds to darkness saturation such that further increase in darkness at the calibration sample will not increase the darkness level at the pixels.

The display may be a built-in display of the reference apparatus or an external display. For example, the reference apparatus may have a video output or a projector output to cause display of the image on the external display.

In an example, the method includes identifying a display portion of a display associated with the reference apparatus, the display portion being such that an image of the calibration sample corresponding to an image appearing on that display portion when captured such that the brightness levels on the captured image are within the predetermined range of brightness levels will provide sufficient data to facilitate verification of authentication. The method includes aiming the reference apparatus at calibration sample such that an image of the calibration sample will appear on a portion of a display, capturing an image of the calibration sample while under illumination of the light emitting device, analyzing brightness levels on the captured image, devising the visual guide on that display portion when the brightness levels on the captured image are within the predetermined range of brightness levels.

In an example, the method includes selecting a display portion having a more optimal distribution of brightness levels on the captured image for authentication verification as the visual guide when there are more than one display portions satisfying requirements.

In an example, the method includes selecting a display portion that is outside an axis of light projection which corresponds to a line of the brightest illumination by the light emitting device on the sample target authentication device to devise the visual guide.

In an example, the method is in the form of a downloadable software application for running on an apparatus comprising a processor, and the downloadable application is apparatus specific such that the application is to be downloaded for a specific apparatus with reference to the model number of the apparatus to run the authentication method. The apparatus may be a staple microprocessor-based device such as a smart phone, a tablet computer or a digital camera.

The method may be implemented in hardware, software, firmware or a combination thereof. In an example, the method is implemented on a smart phone such that the smart phone operates as an authentication apparatus running the authentication image capturing method upon actuation by a user.

Therefore, an authentication apparatus for verifying authenticity of a target authentication device is disclosed. The authentication apparatus comprises an image capturing device, a light emitting device for illuminating an object to be captured by the image capturing device, a visual guide to guide a user to aim the apparatus at a target authentication device, and a processor. The visual guide is such that when the apparatus aims at a target authentication device following guidance of the visual guide on execution of an authentication process, the content and quality of fidelity of an image of the target authentication device captured by the image capturing device under operational illumination of the light emitting device are sufficient to facilitate verification of authenticity of the target authentication device.

In an example, the visual guide is such that when the apparatus is aimed at the target authentication device following guidance of the visual guide, the brightness levels on an image of the target authentication device captured by the image capturing device while under operational illumination of the light emitting device are within a predetermined range of brightness levels to facilitate verification of authenticity with reference to the captured image of the target authentication device.

In an example, the processor is to process the captured image to generate a visible representation of security features embedded in the target authentication device for a user to verify authenticity of the target authentication device.

In an example, the visual guide includes an alignment device for aligning with a corresponding alignment device on the target authentication device. The visual guide and the light emitting device may be arranged such that an axis of light projection corresponding to a line of the brightest illumination by the light emitting device falls outside security features of the target authentication device when the apparatus is aimed at the target authentication device following guidance of the visual guide such that the alignment device of the visual guide and the corresponding alignment device on the target authentication device are aligned.

In an example, the apparatus includes an associated display device and the processor is to generate the visual guide on the associated display device.

The apparatus may include a projector and the processor is to generate the visual guide for projection by the projector.

The target authentication device may comprise an embedded security device having hidden security features, such as digitally coded security features, and the processor is to process the captured image of the target authentication device to extract the security features for display.

Example of authentication methods and authentication apparatus will be described in more details below with reference to the accompanying Figures.

The functional block diagram of FIG. 1 depicts an example apparatus 100 which is capable of operating as an authentication apparatus and comprises a processor 102, an antenna 104, a memory 106, a display 108, an image capturing device 110, a light emitting device 112 and a visual guide 114. A smart phone is an example of such an apparatus. The display screen is to facilitate visual interface with a user and usually comprises a matrix of liquid crystal cells which collectively form an LCD display. An LCD display of many electronic devices having more than 1 million pixels is common place nowadays. For example, a typical LCD display of smart phones have the pixel size of 320×480 pixels, 640×960 pixels, or 640×1136 pixels distributed in a 10-cm diagonal screen. The image capturing device comprises an image collector which is optically coupled to an image sensor. The image collector may be a lens, an assembly of lens or a pin-hole device. The image sensor includes a matrix of image sensing elements such as an array of charge coupled devices (CCD). The number of image sensing elements is approximately at a 1:1 correspondence with the pixel size of the display screen but the actual number of images sensing elements can be different depending on the application and design. Each image sensing element forms a pixel of an image collected by the image capturing device and each of the image sensing elements is deployed to detect the brightness level of light imparting on it. A digital image is formed when the entirety of data representing the brightness levels of individual pixels is collected by the processor in spatial order and stored.

The light emitting device is to provide supplemental illumination on an object when an image of the object is to be taken by the image capturing device under an ambient condition when the ambient light level is insufficient. Supplemental illumination is often required when the ambient illumination is below a level which is needed for the image capturing device to produce an image of sufficient quality of fidelity to facilitate verification of authenticity. The light emitting device of this example comprises LED lamps which are arranged to emit a beam of light along an axis of light projection towards a target object. The axis of light projection is characteristic of the light emitting device and defines a direction of brightest illumination such that the portion of the object intercepting or encountering the axis of light projection will experience the brightest supplemental illumination.

The visual guide is to provide visible guidance to assist a user to aim the authentication apparatus at a target authentication device so that when the authentication apparatus is aimed at the target authentication device following the guidance of the visual guide, an image of the target authentication captured by the image capturing device of the authentication apparatus will contain a sufficient quantity of necessary authentication data and have a sufficient quality of fidelity to facilitate verification of authenticity.

So that a captured image of the target authentication device contains sufficient quantity of data to facilitate verification of authenticity, the visual guide defines an image alignment device such as an image alignment window such that when the apparatus is aimed at the target authentication device with the image alignment device on the target authentication device aligned with a corresponding image alignment device on the visual guide, the captured image will have a sufficient quantity of necessary authentication data to facilitate verification. In general, the data image will be sufficient in quantity if the captured image has captured the portion of the target authentication device containing all the security data which are embedded in the target authentication device. In many modern-day applications, the security data are digitally encoded in the target authentication device.

So that a captured image of the target authentication device have a sufficient quality of fidelity to facilitate verification of authenticity, the visual guide defines an illumination alignment device such as an illumination alignment window such that when the apparatus is aimed at the target authentication device with the illumination alignment device on the target authentication device aligned with a corresponding an illumination alignment device on the visual guide, the supplement illumination falling on the authentication device or at least the portion of the authentication device to be authenticated will result in an image at the image capturing device such that the brightness levels of the pixels are within a prescribed range of brightness levels which is to facilitate verification of authenticity. Specifically, the prescribed range of brightness levels is a range within which the brightness levels of all the pixels of the captured image are neither over-exposed nor under-exposed. An image or a portion of an image is over-exposed when taken under over-illumination of the light emitting device such that the brightness level of the pixel reaches the saturation intensity. An image or a portion of an image is under-exposed when taken with insufficient or under illumination. Over-exposure and under-exposure are undesirable in authentication applications since an over-exposed or an under-exposed image means distortion and/or loss of important details during the image capturing process.

The processor is to set the visual guide on the display to provide guidance or assistance to a user to capture an image of a target authentication device having a sufficient data quantity and a sufficient quality of fidelity. In an example, the processor is to set the illumination alignment device and the image alignment device on the display screen upon activation of an authentication process. In an example, the illumination alignment device and the image alignment device are combined as a single visual alignment device and the processor is to set the visual alignment device to be shown on a portion of the display to guide user. The processor is to operate the image capturing device and the light emitting device to capture an image of the authentication device when confirmed by a user that an image of the target authentication device appearing on the display screen is aligned with the visual alignment device. In an example, an authentication verification process may be resident on the apparatus to perform verification of authenticity of a target authentication device with reference to a set of pre-stored parameters such as an image of a reference authentication device stored on the apparatus. In another example, the authentication process may output the captured image of a target authentication device for external or remote verification.

The memory is for storing an authentication operation process, such as an authentication image capturing scheme and/or an authentication verification scheme for execution by the processor. The antenna is optional and is present when the apparatus is equipped with telecommunications functionality, such as a mobile phone.

Operation of an example authentication apparatus comprising a smart phone depicted in FIGS. 1A and 1B which is installed with an authentication process to operate as an authentication apparatus will be described. An iPhone™ such as an iPhone™, iPhone 4™, iPhone 4S™, iPhone 5™ of the Apple Inc., or a Galaxy™ smart phone of Samsung inc., are examples of smart phones that can be used.

Figures 1A, 1B:
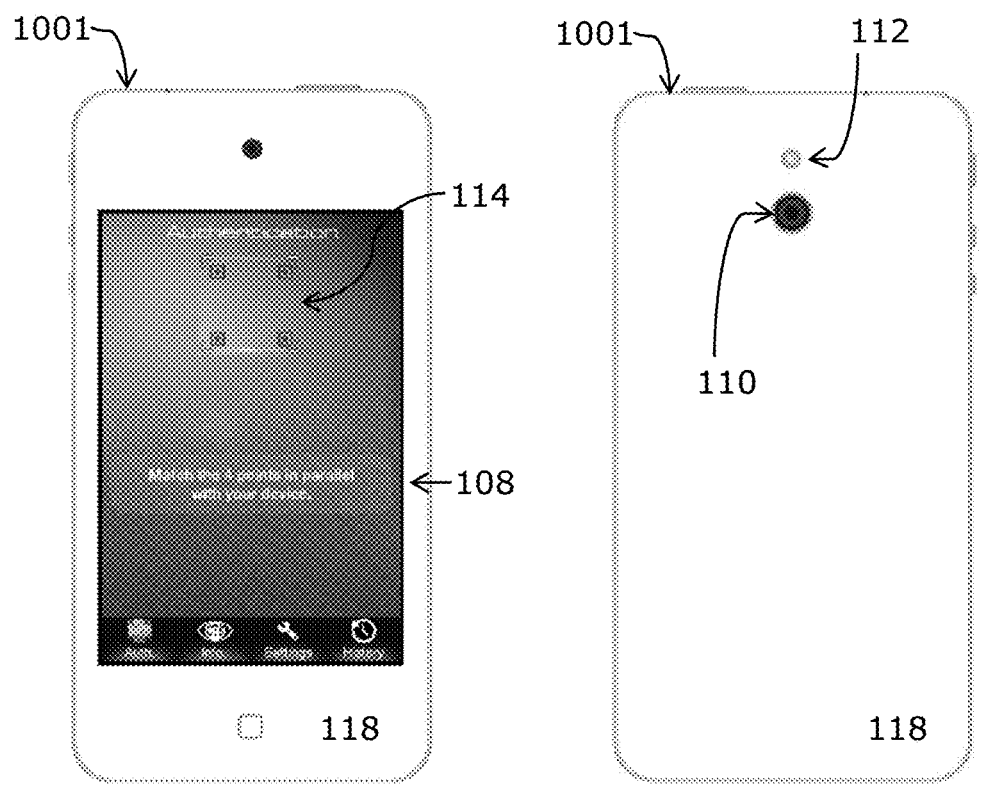
FIG. 1A is a first view of an example authentication apparatus having the functional block diagram of FIG. 1
FIG. 1B is a second view of the example authentication apparatus of FIG. 1A.
Figure 2A:
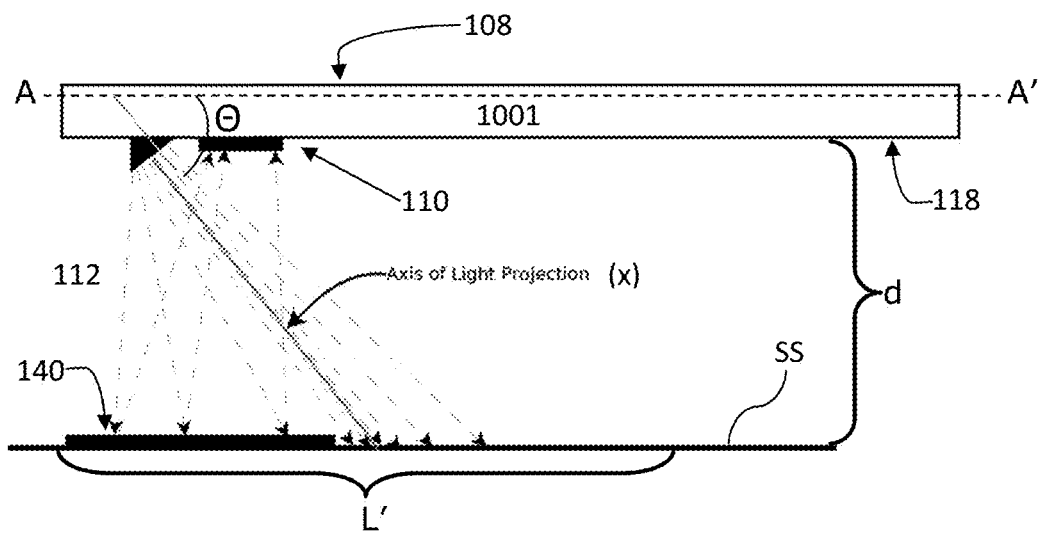
FIGS. 2A and 2B depict an example operation using the authentication apparatus of FIG. 1A to take an image of an example authentication device respectively at a first location and a second location.
Figure 2B:
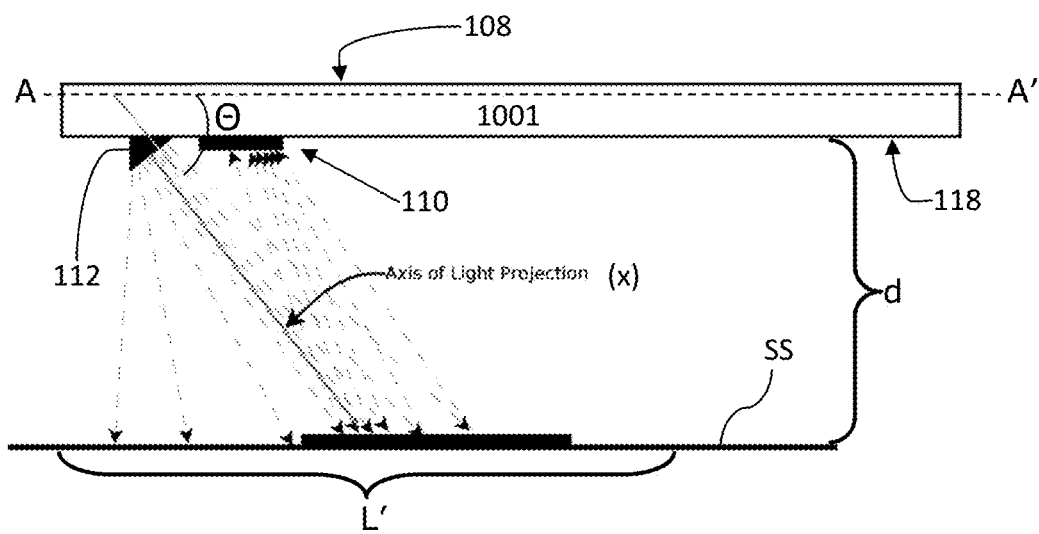

The example authentication apparatus 1001 of FIGS. 1A and 1B comprises a processor 102, an antenna 104, a memory 106, a display screen 108, an image capturing device 110, a light emitting device 112 and a visual guide 114 of the type described above. An authentication process is stored in the memory of the authentication apparatus. The authentication apparatus 1001 includes a rigid and elongate housing 118 of hard plastics which extends along a longitudinal direction that is parallel to a longitudinal axis A-A' as depicted in FIGS. 2A and 2B. The image capturing device 110 and the light emitting device 112 are on different major sides of the housing 118. Specifically, the image capturing device 110 and the light emitting device 112 are on the back side of the housing 118 while the display screen 108 is on the front side of the housing 118. When an image of an object is captured during authentication operation, the housing 118 is between the object and its image on display.

The light emitting device 112 is arranged to project light towards a longitudinal end of the housing which is distal from the light emitting device 112. As depicted in FIGS. 2A and 2B, the axis of light projection X of light emitting device 112 is at an acute angle θ to the longitudinal axis A-A'. The image capturing device 110 and the display screen 108 are such that when an object having a planar surface of length L' is placed with its planar surface parallel to and at a distance d from the longitudinal axis A-A', a corresponding image of the object will just occupy the entire length L of the display screen 108, and the image on display is geometrically proportional or substantially proportional to the planar surface.

Figure 3A:
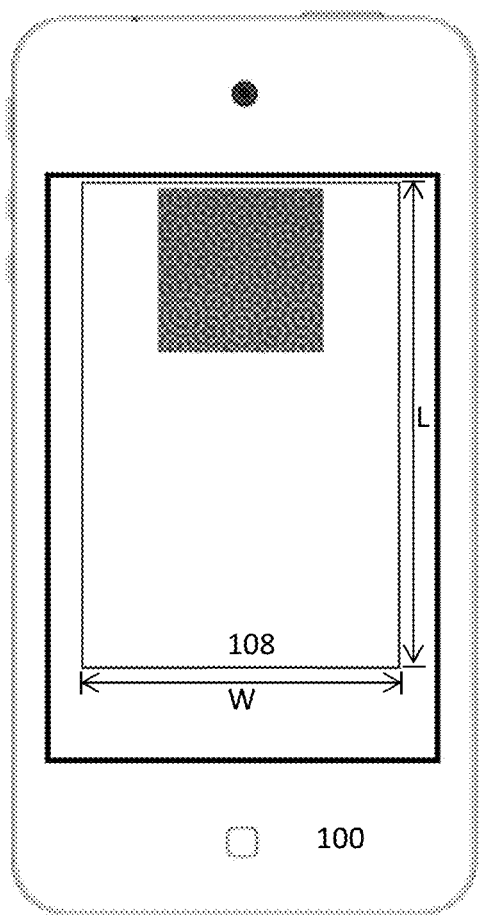
FIGS. 3A and 3B depict schematic representations of an image of the example authentication device appearing on the display of the example authentication apparatus of FIG. 1A corresponding to capturing at the locations of FIGS. 2A and 2B respectively.
Figure 3B:
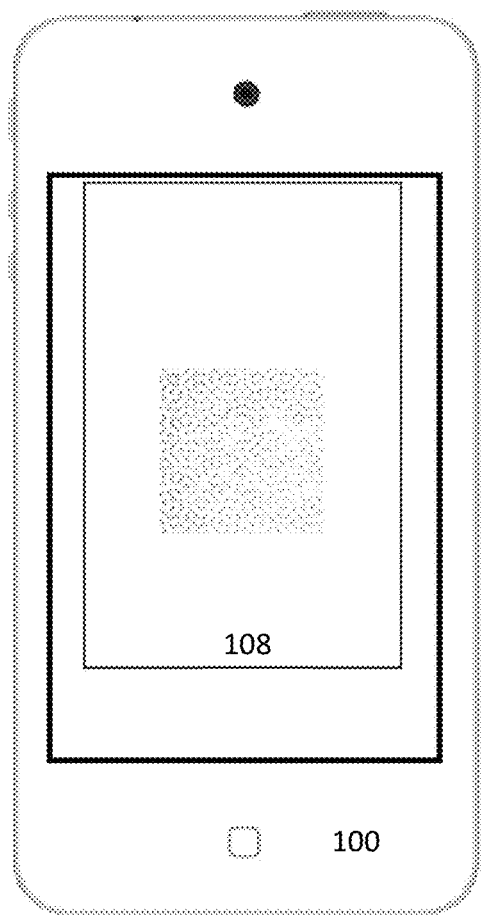

In this example, the visual guide 114 is devised such that when the visual alignment device of the visual guide appearing on the display screen is shown to be in alignment with a corresponding alignment means on the target authentication device 140, the target authentication device 140 to be authenticated will be at the location as depicted in FIG. 2A relative to apparatus, the planar surface to be authenticated will be at a distance d from the axis A-A', and the image will appear on the portion of the display screen as shown in FIG. 3A. On the other hand, when the relative position between the target authentication device 140 and the apparatus 1001 is changed such that the target authentication device 140 is relatively closer to the distal longitudinal end of the apparatus while maintaining an image of the same or similar size as depicted in FIG. 2B, the image will appear on the portion of the display screen which is closer to the distal longitudinal end as shown in FIG. 3B.

When the authentication process is activated by a user, for example, by activating a touch-screen icon, the authentication process will be activated and the visual guide 114 will be displayed on the display screen 108 as depicted in FIG. 1A to inform a user that the apparatus is now ready and available to operate as an authentication apparatus to verify the authenticity of a target authentication device 140.

Upon activation, the processor will generate an alignment device which is to appear on a portion of the display screen to guide a user to aim the apparatus at a target authentication device as depicted in FIG. 1A. A user will activate the authentication apparatus to capture an image of the authentication device for authentication applications when the alignment device on the display screen is aligned with an alignment device on the target authentication device. The image captured by this process is shown in FIG. 4A and has an acceptable brightness level distribution as depicted in FIG. 4 according to the criterion of FIG. 4B.

Where an image is captured with the target authentication device out of a region defined by the visual alignment device while maintaining the same image size (or content) on the display screen, an image having a different pixel brightness distribution to that of FIG. 4 will result. For example, when the target authentication device is shifted towards the axis of light projection X of the light emitting device while maintaining the same image size of the target authentication device, an over-exposed image as shown in FIG. 5A having a pixel brightness distribution as depicted in FIG. 5 which is not acceptable according to the criterion of FIG. 5B will result. The over-exposed image is resulted since a substantial portion of the target authentication device intercepts with the axis of light projection of the light emitting device.

An example calibration scheme to calibrate a reference authentication apparatus to devise a visual guide will be described below. The calibration result will be applied for use on other authentication apparatus having the same or compatible image capturing specifications. Apparatus of the same image capturing specifications in the present context means that the apparatus have the same or equivalent light emitting device and the same or equivalent image capturing device arranged in the same inter-relationship.

In order to facilitate capturing of an image of the reference authentication device having sufficient image data to facilitate authentication of other target authentication devices, a visual alignment device as an example of a visual guide depicted in FIG. 1A is set on the display of the reference authentication apparatus for user guidance. The visual alignment device is devised to assist a user to collect an image having a sufficient quantity of image data from a target authentication device to facilitate verification of authentication and comprises alignment means. The example alignment means comprises alignment markers which are distributed at corners of the visual alignment device. The alignment markers are arranged such that when the alignment markers are visually aligned with corresponding alignment markers on the reference authentication device, the image to be collected will contain a sufficient quantity of image data to facilitate verification of authenticity.

The example reference target authentication device of FIG. 4A has an overall dimension of 15 mm×15 mm (width×length) of which only a 9 mm×9 mm portion at the centre defines the digitally coded security features. This 9 mm×9 mm portion can be fully and accurately represented by digital coding of 100 pixels×100 pixels. This quantity of pixel provides a sufficient quantity of image data to facilitate meaningful authentication applications with reference to an image of a sufficient resolution level. Therefore, the visual alignment device is devised to capture 300 pixels×300 pixels as an example. When the visual alignment device is shown on the display as being aligned with a corresponding alignment device on the example reference authentication device, the entire 15 mm×15 mm of the reference authentication device will be captured and stored as 300 pixels×300 pixels available for verification, although only the 100 pixels×100 pixels corresponding to the central portion of the captured image contain the critical data needed for authentication.

In addition to having a sufficient quantity of image data, the fidelity of the captured image data is also important so that a meaningful authentication can be performed with respect to the captured image. In order that the captured image truly represents the target authentication device, the image alignment device is moved to different locations on the display to correspond to different illumination conditions by the light emitting device. It is noted that when the brightness level of the captured image of the reference target authentication device are distributed between the upper and lower brightness thresholds, the fidelity of the image is acceptable for authentication. On the other hand, when the brightness level of the captured image of the reference target authentication device falls outside the upper brightness threshold or the lower brightness threshold, the fidelity of the image is not acceptable for authentication.

Figure 6:
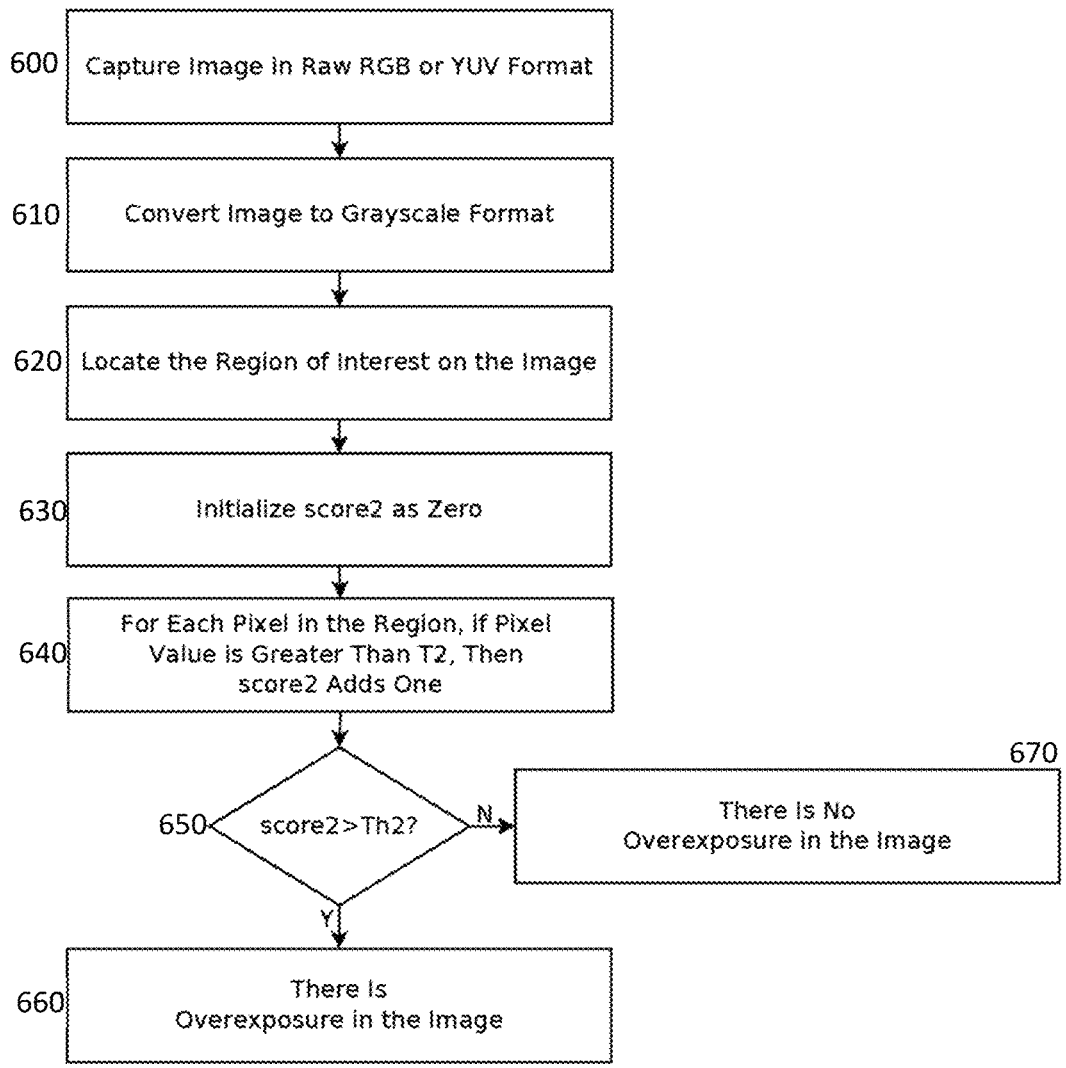
FIG. 6 depicts an example flow chart to devise a visual guide with reference to an upper threshold brightness level.

FIG. 6 depicts an example flow chart to determine whether a captured image satisfied the pixel brightness requirements with respect to the upper brightness threshold T2. At step 600, an image of the reference target authentication device is captured in raw RGB or YUV format. At step 610, the image data is converted into pixel data in greyscale (or grayscale) format. At step 620, the greyscale data corresponding to a region of the captured image which is of importance to facilitate authenticity verification is selected to analyze whether the requirements on the upper brightness threshold T2 are met. At step 630, a score (score2) representing the number of pixels having a brightness or intensity exceeding the upper brightness threshold T2 is initialized to zero. At step 640, the number of pixels having a brightness or intensity exceeding the upper brightness threshold T2 is counted. The total number of pixels having a brightness or intensity exceeding the upper brightness threshold T2 is calculated and a decision is to be made at step 650. If the total number of pixels having a brightness or intensity level exceeding the upper brightness threshold T2 is above a threshold count Th2, there is an over-exposure problem with the captured image and the image (and hence the location of the reference target authentication device relative to the apparatus) is not acceptable as the quality of fidelity would not be acceptable to perform a meaningful authentication verification process. On the other hand, if the total number of pixels having a brightness or intensity level exceeding the upper brightness threshold T2 does not exceed the threshold count Th2, there is no over-exposure problem with the captured image and the image (and hence the location of the reference target authentication device relative to the apparatus) is acceptable as the quality of fidelity would be acceptable to perform a meaningful authentication verification process.

Figure 7:
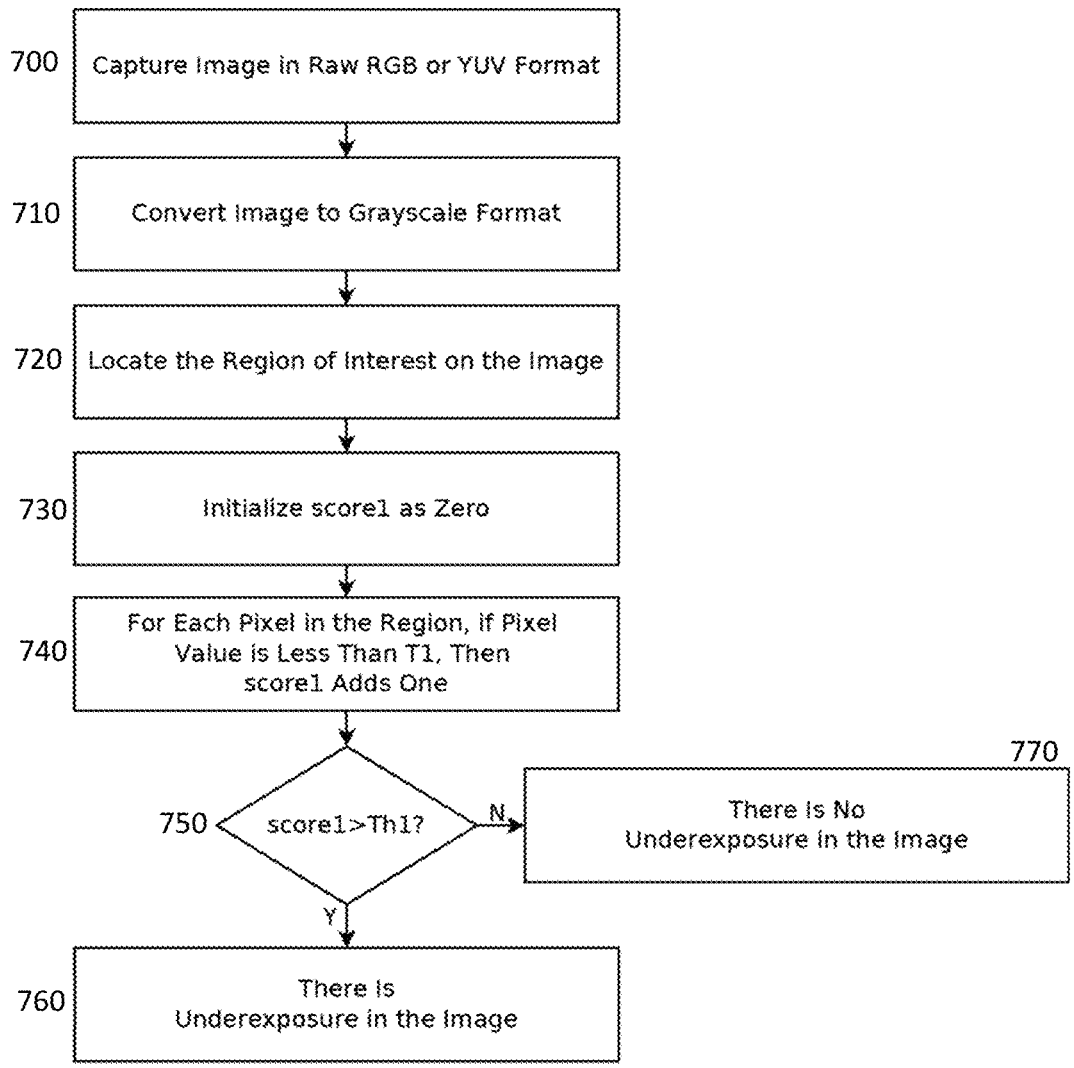
FIG. 7 depicts an example flow chart to devise a visual guide with reference to a lower threshold brightness level.

FIG. 7 depicts an example flow chart to determine whether a captured image satisfied the pixel brightness requirements with respect to the lower brightness threshold T1. At step 700, an image of the reference target authentication device is captured in raw RGB or YUV format. At step 710, the image data are converted into pixel data in greyscale (or grayscale) format. At step 720, the greyscale data corresponding to a region of the captured image which is of importance to facilitate authenticity verification are selected to analyze whether the requirements on the lower brightness threshold T1 are met. At step 730, a score (score2) representing the number of pixels having a brightness or intensity falling below the lower brightness threshold T1 is initialized to zero. At step 740, the number of pixels having a brightness or intensity below the lower brightness threshold T1 is counted. The total number of pixels having a brightness or intensity below the lower brightness threshold T1 is calculated and a decision is to be made at step 750. If the total number of pixels having a brightness or intensity level below the lower brightness threshold T1 is above a threshold count Th1, there is an under-exposure problem with the captured image and the image (and hence the location of the reference target authentication device relative to the apparatus) is not acceptable as the quality of fidelity would not be acceptable to perform a meaningful authentication verification process. On the other hand, if the total number of pixels having a brightness or intensity level below the lower brightness threshold T1 does not exceed the threshold count Th1, there is no under-exposure problem with the captured image and the image (and hence the location of the reference target authentication device relative to the apparatus) is acceptable as the quality of fidelity would be acceptable to perform a meaningful authentication verification process.

For example, an image of the reference authentication device as shown in FIG. 5A was taken with the visual guide corresponding to the reference authentication device at the location shown in FIG. 3B. The image is very pale or whitened because it contains image data which are above an upper brightness threshold T2 and the data fidelity is not acceptable. On the other hand, the image of the reference authentication device as shown in FIG. 4A was taken with the visual guide corresponding to the reference authentication device at the location shown in FIG. 3A. This image has all the image data within a brightness range which is a range between a lower threshold brightness level T1 and an upper brightness threshold T2. All the data within this brightness range has a data fidelity which is acceptable for authentication applications.

After evaluating several images of the reference authentication device, the location of a visual alignment device corresponding to a captured image meeting the aforesaid brightness range requirements will be selected and set as the visual alignment device of the reference authentication apparatus to complete calibration.

In an example, instead of evaluating the distribution of pixel brightness levels on a captured image, the data fidelity of the captured image can be evaluated by decoding the captured image to recover the digital coding embedded in the captured image and comparing the data with that of the reference target authentication device. A visual guide which generates an image having an acceptable data fidelity level will then be selected and set as the visual alignment device of the authentication device to complete calibration.

In another example, an extended sample authentication device having the same content as that of the reference authentication device of FIG. 4A but extended to cover the entire range of the image capturing device may be used to calibrate and set a visual guide. An image of the extended sample authentication device is captured and the data fidelity of the digitally coded data is examined to select a region having acceptable data fidelity to be set as a location of the visual guide to complete calibration.

After calibration has completed and the visual guide devised, the visual guide can be included as part of an authentication process for guiding a user to capture an image of a target authentication device for verification of authenticity. The verification can be done internally by the apparatus or externally by another authentication apparatus without loss of generality.

In an example, the calibration data are used to devise a visual guide on an authentication apparatus, such as an authentication apparatus of FIG. 1A, upon execution of an authentication process. The authentication process may be made available as an application software for a smart phone for which calibration has been done to set a visual guide such that upon installation and activation, the smart phone or compatible apparatus will operate as an authentication apparatus.

Figure 8:
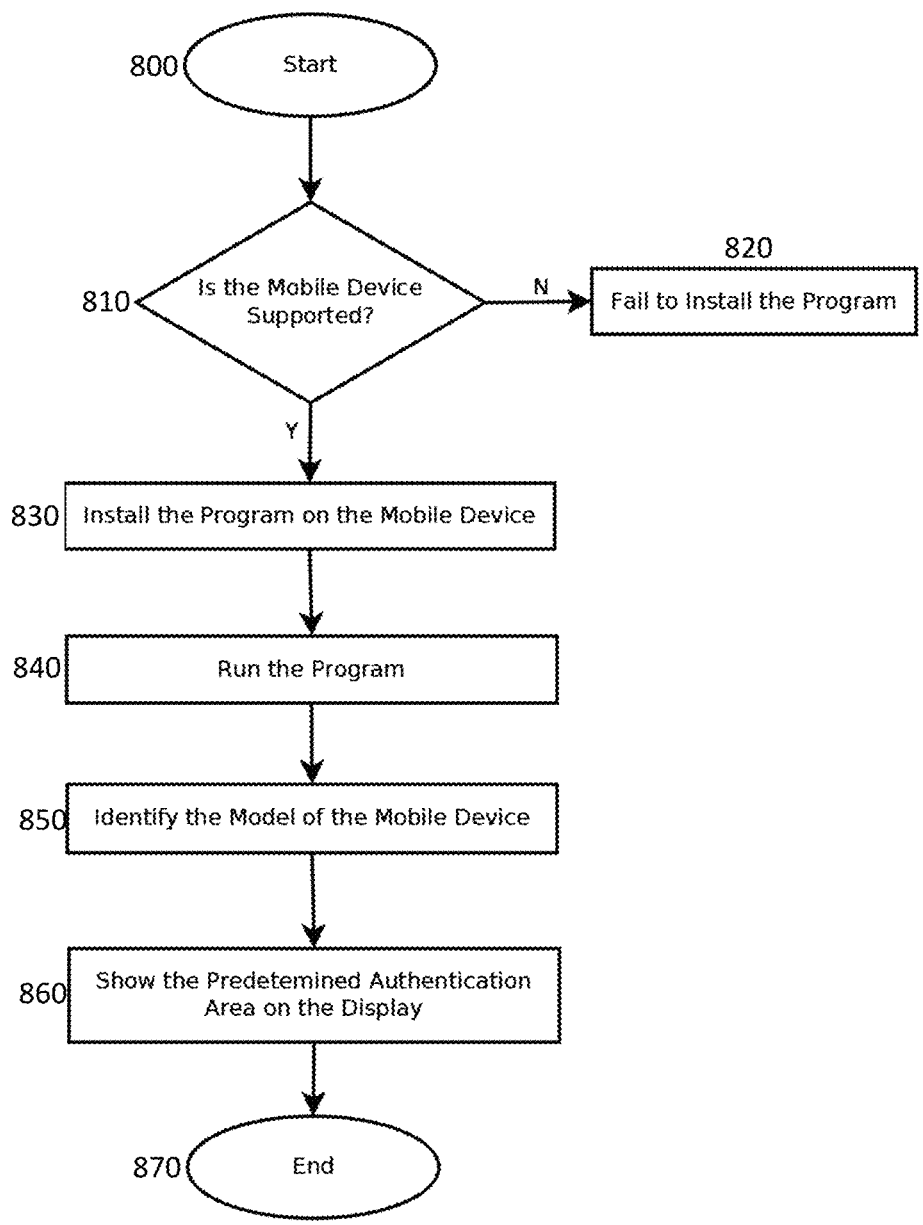
FIG. 8 is an example flowchart depicting execution of an example authentication process on an example authentication apparatus.
Figure 9:
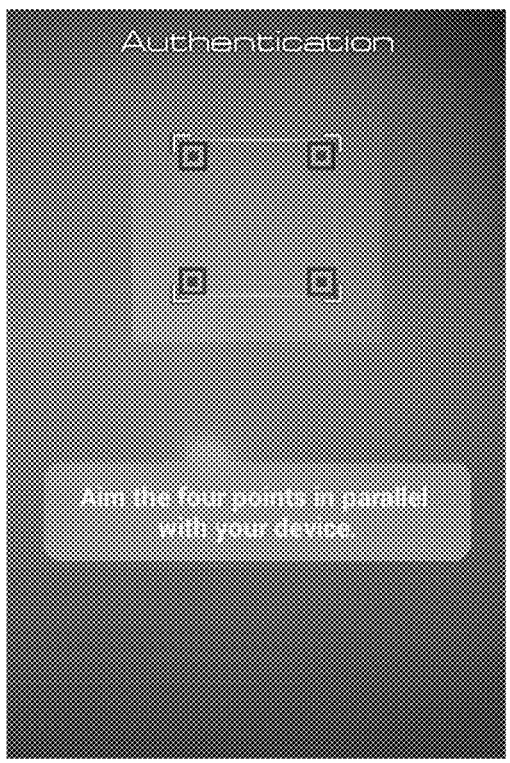
FIGS. 9, 9A, and 9B are screen views depicting example operation of the authentication process of FIG. 8 on the example authentication apparatus of FIG. 1A.
Figure 9A:
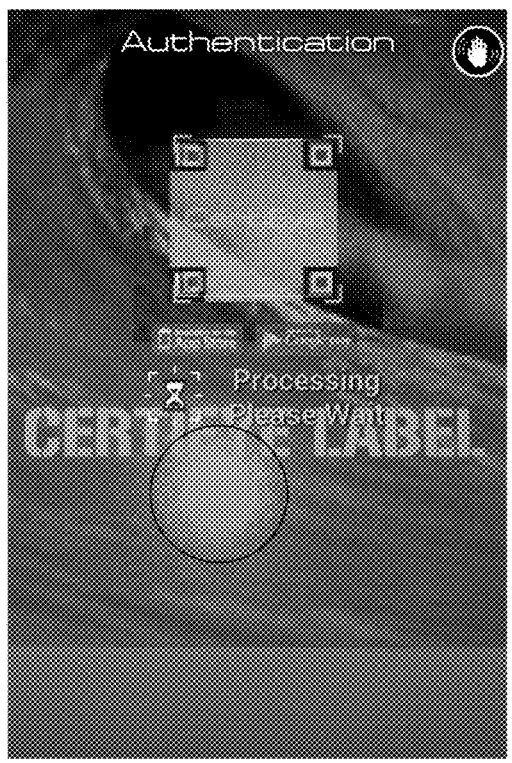
Figure 9B:
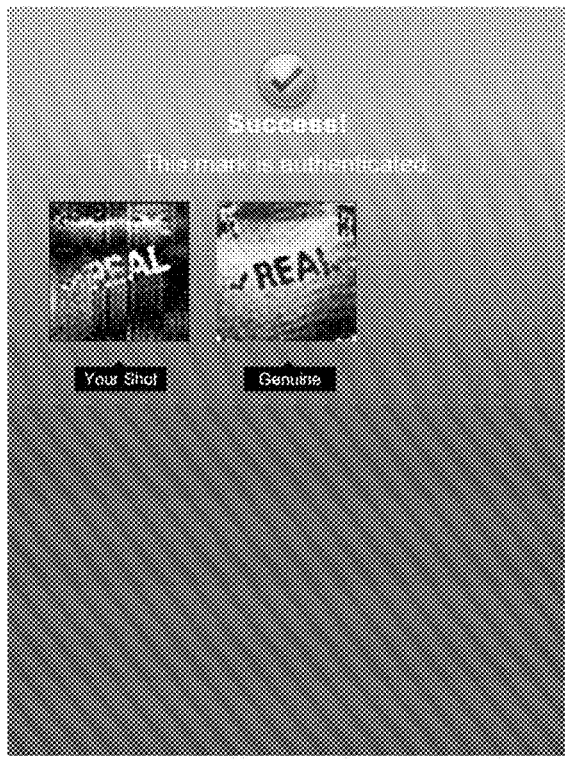

As depicted in FIG. 8, a user may access the Internet to look for an authentication application software designated for a specific model of smart phone. If there is an application software available for the specific smart phone, the application software will be downloaded and installed on the smart phone. Upon execution of the application software for authentication of a target authentication device, the model identification of the smart phone will be confirmed and the visual guide will appear on the display to run the authentication process as depicted in FIGS. 9 to 9B.

When the visual guide appears on the display, a text message on the display will guide the user to align the visual guide with a corresponding alignment device on the target authentication device. A user will then aim the authentication apparatus so that the image capturing device is ready to capture an image of the target authentication device shown on the display. The processor will then operate the image capturing device to capture and store an image of the target authentication device upon receipt of a confirmation signal given by the user. The apparatus can then perform verification using an internal or built-in verification algorithm or make the captured image available for external verification.

FIG. 8 depicts an example flow chart illustrating steps whereby a mobile phone is to operate as an authentication apparatus upon execution of an authentication process. The process starts at step 800 when a user looks for an authentication process in the form of application software that is adapted for use for a specific type of device. A decision will be made at step 810. If there is no applicable software application, the process at step 820 will terminate and the mobile device cannot operate as an authentication apparatus for in respect of a target authentication device. On the other hand, if there is an applicable software application available, the process at step 830 will obtain the software and install on the mobile device. At step 840, the mobile device after having installed the application software will execute the software and run the authentication process defined by the application software. Where the software application is suitable for more than one mobile device, the process at step 850 will identify the model of the mobile device. On execution of the authentication process at step 860, the processor will devise a visual guide on the display to guide a user to operate the authentication apparatus and an image of a target authentication device will be captured by the authentication apparatus upon receipt of instructions given by a user. The visual guide may also include text messages as shown in FIGS. 9 to 9B. The process ends at step 870 after an image of the target authentication device has been captured and corresponding verification process completed.

Figure 10A:
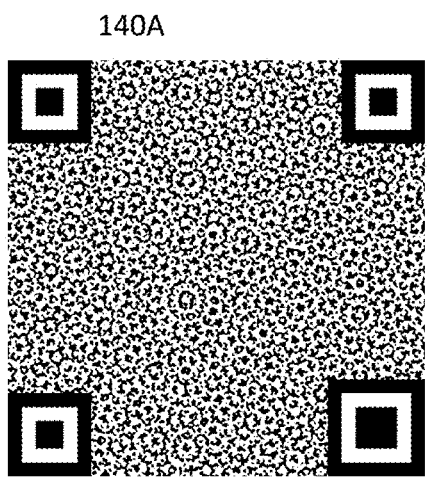
FIG. 10A is an image of an example authentication device 140A comprising a data bearing image pattern.

The example composite information bearing device of FIG. 10A is for permanently affixing on a carrying medium to form an authentication device. The carrying medium may be a permanent or non-volatile carrying medium such as a sheet of paper, a sheet of plastics, or a piece of woven materials comprising woven data bearing elements. In example applications, the authentication device is part of a product label, part of a product tag or part of a product, and may be affixed by printing, by laser etching, by lithography or other affixing processes. The composite information bearing device comprises a data bearing image pattern and an alignment device. The example data bearing image pattern is an image pattern embedding data having data characteristics which are defined by the plurality of image defining elements. The image defining elements (also referred to as pattern defining elements) of the example data bearing image pattern are distributed according to a coding scheme to define an image pattern which is characteristic of the data embedded in the image pattern.

Figure 10B:
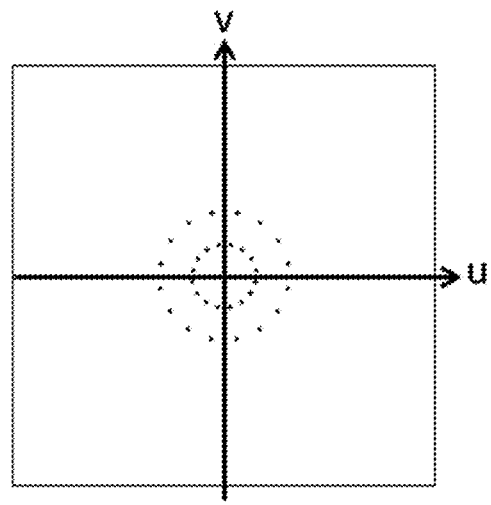
FIG. 10B is a schematic data diagram depicting data embedded in the data bearing image pattern of FIG. 10A, FIGS. 10C and 10D are, respectively, data bearing image patterns of a first set of data and a second set of data embedded in the data bearing image pattern of FIG. 10A.

In some embodiments such as the present, the image defining elements are distributed by operating a coding scheme on a set of discrete data, for example a set of discrete data schematically depicted in FIG. 10B. In some embodiments such as the present, the coding scheme is a mathematical coding scheme and image defining elements of the image pattern are coded and spread or distributed to define the data bearing image pattern and to correlate mathematically to the set of discrete data to be embedded in the image pattern. In some embodiments, the coding scheme is a computational coding scheme and image defining elements of the image pattern are coded and spread or distributed to define the data bearing image pattern and to correlate computationally to the set of discrete data to be embedded in the image pattern.

The data bearing image pattern is formed by using very fine image defining elements so higher and lower frequency data can be embedded in a single data bearing image pattern. In some embodiments such as the present, N'×M' image defining elements are distributed in a matrix of N' rows and M' columns to form the image pattern and the image defining elements have a linear distribution density of R image defining elements per inch or R' image defining elements per cm. An image defining element herein is the basic, smallest or fundamental unit of an image pattern and is also referred to as a pixel or a dot. The resolution of an image pattern is defined by R DPI (dot-per-inch) or R PPI (pixel-per-inch) or their metric system equivalent. The example authentication device or more exactly the data bearing image pattern, has a physical size of 1 cm×1 cm and is adequately characterized by N×M image defining elements where N=N'=M=M'=512 in this example. The example authentication device is affixed on a high resolution carrying medium by a affixing such as a high-resolution printing process having a resolution or an image defining element density of R=1200 DPI or 1200 PPI or R=2400 DPI or 2400 PPI.

A data bearing image pattern or its coding characteristics can be represented by the expression f(x, y), where f(x, y) is the spatial domain characteristics of the image pattern at spatial coordinates (x, y), and x=1, ... M and y=1, ..., N are the spatial coordinates of each image defining element. The data bearing image pattern is correlated to a set of data which is represented or characterised by an expression F(u, v), where u, v are coordinates in the data domain.

In the example of FIG. 10A, the image defining elements of the data bearing image pattern are distributed or spread to embed spatial frequency characteristics of a set of discrete data F(u, v), where F(u, v) is the frequency domain characteristics of the frequency domain counterpart of the image pattern at frequency domain coordinates (u, v). Therefore, the data bearing image pattern F(u, v) has a frequency domain counterpart F(u, v).

The example data bearing image pattern of FIG. 10A and the data of FIG. 10B embedded therein are correlated by Fourier transform as an example data coding scheme. When the data bearing image pattern and the set of data are correlated by the Fourier Transform, the properties of the image defining elements are described in spatial domain ((x, y), the data in frequency domain (u, v), and the frequency domain representation F(u, v) and the spatial domain representation f(x, y) have and are related by the expressions below.

$$F(u, v) = \frac{1}{MN}\sum_{y=0}^{N-1}\sum_{x=0}^{M-1} f(x, y)\exp\left(\frac{-j2\pi ux}{M}\right)\exp\left(\frac{-j2\pi vy}{N}\right) \quad \text{(Eqn. 1)}$$

$$f(x, y) = \text{Re}\left[\sum_{u=0}^{N-1}\sum_{v=0}^{M-1} F(u, v)\exp\left(\frac{j2\pi ux}{N}\right)\exp\left(\frac{j2\pi vy}{M}\right)\right], \quad \text{(Eqn. 2)}$$

$$\|F(u, v)\| = \sqrt{(\text{Re}(F(u, v)))^2 + (\text{Im}(F(u, v)))^2} \quad \text{(Eqn. 3)}$$

In the above expressions, $\|F(u, v)\|$ is the magnitude of a data having the frequency domain coordinates (u, v), Re(F(u, v)) means the real part of F(u, v), Im(F(u, v)) means the imaginary part of F(u, v) and $j=\sqrt{-1}$.

The example set of frequency domain data comprises two data portions, namely, a first or outer data portion comprising an example plurality of eight data points distributed on an outer data circle and a second or inner portion comprising an example plurality of eight data points distributed on an inner data circle. The data points are distributed on the positive quadrants of the u-axis and the data points on the negative quadrants of the u-axis image data points. In some embodiments, the data may be embedded using Bessel Transform (for example, Bessel function of the first kind), Cosine Transform or other transformation schemes which can operate on a discrete data to produce a spread pattern of scattered image defining elements which is not human perceivable, for example, not readable by naked human eyes.

The example first data portion comprises an example plurality of eight discrete frequency data points {(D1), (D2), (D3), (D4), (D5), (D6), (D7), (D8)}. Each one of the discrete data points Di has a discrete frequency domain coordinate value of ($u_i$, $v_i$), where the frequency domain coordinates ($u_i$, $v_i$) of each D'i has a magnitude of 200 LPI, i=1, 2, ..., 8, and the function F(u, v) has a discrete or binary value of either "0" or "1" such that $$F(u, v) = \begin{cases} 1, \text{ if } (u, v) = \{(D1), (D2), (D3), (D4), (D5), (D6), (D7), (D8)\} \\ 0, \text{ otherwise} \end{cases}.$$

The example second data portion comprises an example plurality of eight discrete frequency data points {(D'1), (D'2), (D'3), (D'4), (D'5), (D'6), (D'7), (D'8)}. Each one of the discrete data points D'i has a discrete frequency domain coordinate value of ($u_i$, $v_i$), where the frequency domain coordinates ($u_i$, $v_i$) of each D'i has a magnitude of 100 LPI, i=1, 2, . . . , 8, and the function F(u, v) has a discrete or binary value of either "0" or "1" such that $$F(u, v) = \begin{cases} 1, \text{ if } (u, v) = \{(D'1), (D'2), (D'3), (D'4), (D'5), (D'6), (D'7), (D'8)\} \\ 0, \text{ otherwise} \end{cases}$$

In this example, the data points on the outer data circle have a higher spatial frequency (or "frequency" in short") of 200 LPI and the data points on the inner data circle have a lower spatial frequency 100 LPI. In this example, the higher frequency data are set to have a frequency which is substantially higher than the frequency of the lower frequency data as a convenient example.

The data points on each data circle are distributed at uniform angular intervals as a convenient example. In this example, the data points are distributed at example angular orientations of $\alpha_i$, where i=1, 2, . . . , 8, with $\alpha_1$=11.25°, $\alpha_8$=168.75° and adjacent data points of the same data frequency are separated by a uniform angular interval of 22.5° such that the angular orientations of $\alpha_1$ to $\alpha_8$ are respectively:

11.25°, 33.75°, 56.25°, 78.75°, 101.25°, 123.75°, 146.75° and 168.75°.

Figure 10C:
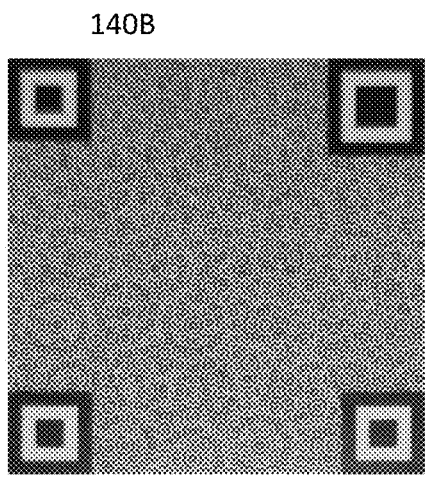
Figure 10D:
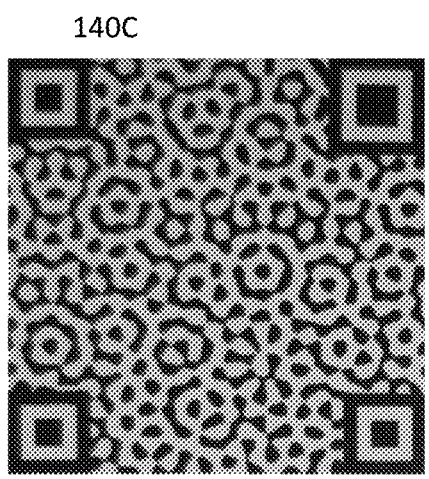

The data bearing image pattern comprises two component patterns, namely, a first component pattern or sub-pattern of higher frequency components (200 LPI) depicted in FIG. 10C and a second component pattern or sub-pattern of lower frequency components (100 LPI) as depicted in FIG. 10D. The two sub-patterns are superimposed on the same area to form the data bearing image pattern. Each sub-pattern comprises spatial feature components which are spaced or disposed at predetermined spatial intervals and at the predetermined angular orientations of $\alpha_1$ to $\alpha_8$ to correspond to the frequency characteristics of the embedded which the spatial feature components represent. For example, identical shaped and sized spatial feature components of FIG. 10C repeat at a uniform spatial interval along the predetermined orientations to correspond to the example higher frequency of 200 LPI at the predetermined example angular orientations $\alpha_1$ to $\alpha_8$. Each example spatial feature component is formed from a plurality of image defining elements. The image defining elements which cooperate to form a spatial feature component are organized or arranged to form an aggregate of image defining elements having a predetermined aggregate shape, a predetermined aggregate dimension and a predetermined aggregate orientation.

In order to capture an image of a data bearing image pattern which purports to be a genuine or authentic authentication device ("target authentication device") for verification or other purposes such as examination purposes, an image capture apparatus may be used. An example image capture apparatus may be a mobile image capture apparatus in the form of a portable smart phone which comprises a processor 102, an antenna 104, a memory 106, a display surface 108, an image capturing device 110 and a light emitting device 112, as depicted in FIGS. 1, 1A and 1B. When an image of a data bearing image pattern is to be captured by the image capture apparatus 100, the data bearing image pattern is to be placed on a support surface SS and the image capture apparatus 100 to be maintained at a distance away from the support surface SS so that the image capturing device 110 is at an image capture distance d away from the support surface. An example image capture apparatus such as the example smart phone of FIG. 1 has a substantially planar display surface 108 which is formed on a display panel, and the panel is mounted on a substantially planar housing such that the display surface 108 and the mobile phone housing are parallel. Parallel herein means being parallel and being substantially parallel. In some embodiments as the present, the data bearing image pattern is designed such that the display surface 108 or the mobile phone housing are to be parallel with the data bearing image pattern or the support surface SS when an image of the data bearing image pattern is to be taken.

The example image capture apparatus is pre-installed with a set of instructions and the set of instructions is pre-stored in the memory 106, for example, as an application software ("App"). When an image of the data bearing image pattern is to be captured, a user will activate the App and the processor 102 will execute the stored instructions to facilitate image capture according to the stored instructions.

When executing the stored instructions, it may be necessary to subject the target authentication device to illumination by the built-in light emitting device 112 of the image capture apparatus so that an image of sufficiently high fidelity is obtained. the illumination may function as supplemental lighting to supplement insufficient ambient or background lighting or as primary illumination when the ambient or background lighting is very low or negligible.

The example built-in light emitting device 112 is a localised light source which is to project visible light along a light projection axis X and an acute view angle towards the support surface SS on which the image pattern to be captured is placed, as depicted in FIGS. 2A and 2B. The example light source is an LED light source which emits a white light concentrating along the light projection axis X and having a small view angle, which is an angle of divergence from the light emitting device 112 or from the image capture apparatus 100. In the example image capture apparatus 100, the light emitting device is located at or near a longitudinal end ("proximal longitudinal end") of the image capture apparatus 100 to project a beam of light along the light projection axis X and in a direction towards an opposite longitudinal end ("distal longitudinal end") of the image capture apparatus 100, as depicted in FIGS. 2A and 2B.

When light emitted by the light emitting device 112 falls on the support surface SS, with the smart phone 100 being held at the capture distance d away from the support surface SS, the level of illumination will be at the highest at the region where the light beam (or more specifically the light projection axis X) meets the support surface SS and this region is the brightness region on the support surface. The location or region where the light beam or the light projection axis X defines a location or region of brightest illumination. The level of illumination on the support surface will gradually reduce, diminish or fall on moving away from the location or region of brightest illumination, which is also a location or region of highest illumination having the highest level of illumination or brightness within the capture surface. More specifically, the illumination level on the support surface due to the light emitting device 112 will gradually fall on moving longitudinally away from the region of highest illumination and towards the distal and proximal longitudinal ends, and on moving laterally away from the region of highest illumination and towards the lateral ends, the lateral direction herein being a direction orthogonal to the longitudinal direction. In another perspective, the illumination level on the support surface due to the light emitting device 112 gradually reduces, diminishes or falls on moving radially away from the region of highest illumination. The distance d is a capture distance which is defined or set so that when the data bearing image pattern is placed on the support surface at that distance, an image of the data bearing image pattern is captured under good focusing conditions, good illumination conditions, and the captured image has a sufficient quantity of pixels and sufficient spatial feature fidelity to recover the embedded data. The term 'good illumination conditions' herein means that the entire data bearing image pattern and all its pixels is under proper illumination with no under-exposure or over-exposure. The support surface at the capture distance is also referred to as the capture surface for succinctness. Due to localised characteristics of the light emitting device 112, the illumination or brightness levels on the capture surface are not constant or uniform but vary or fluctuate along the length L' and width W' of the capture surface. The capture surface, when appearing on the display surface 108, has a corresponding length L and a corresponding width W, as depicted in FIG. 3A. In general, L' is proportional to L by a proportional factor and W' is proportional to W by the same proportional factor.

Example display surfaces of state-of-the-art smart phones are available in various dimensions and resolution levels as shown in Table 1 below.

TABLE 1

| Screen size (diagonal) | Pixels (L) | Pixels (W) | ppi |
|---|---|---|---|
| 4 inches | 1136 | 640 | 326 |
| 4.7 inches | 1334 | 750 | 326 |
| 5.1 inches | 2560 | 1440 | 577 |
| 5.5 inches | 1920 | 1080 | 401 |
| 5.8 inches | 2436 | 1125 | 458 |
| 5.8 inches | 2960 | 1440 | 567.53 |

It will be appreciated that the display surface of a state-of-art smart phone is substantially larger than the surface of the example data bearing image pattern such that a plurality of data bearing image patterns can be displayed side-by-side on the display surface 108.

When a captured data bearing image pattern is processed to recover the embedded data, for example, by reversing the coding scheme, the embedded data and data coordinates will be recovered. A recovered data point has a characteristic signal strength which is characteristic of the data point. To mitigate fluctuation of the absolute values of the characteristic signal strength, for example due to capture conditions such as illumination conditions, the signal strength S(f) of a data point may be expressed with reference to the signal strength of a non-data background and expressed as $$S_i(f) = \frac{S_{i,f}}{B_{i,f}},$$

where $S_{i,f}$ is the signal strength of a data point and $B_{i,f}$ is the signal strength of non-data background in the immediate vicinity of the data point.

For example, the signal strength of a data point Di may be determined by measuring the signal strength of the data point with reference to the signal strength of the non-data background using measurement windows.

Figure 11:
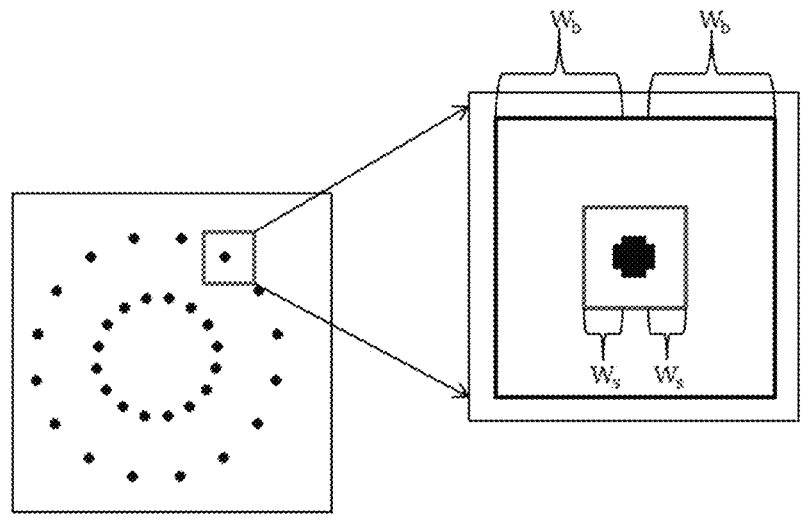
FIG. 11 is an enlarged view of the embedded data of FIG. 10A and an example window for determining signal strength.

Referring to FIGS. 11A and 11B, an example data point signal strength measuring window is set as a square window region $R_{s,i,f}$ having a side dimension of $(2W_s+1)$ frequency units and an example background signal strength measuring window is set as a square window region $R_{b,i,f}$ having a side dimension of $(2W_b+1)$ frequency units, with both windows centred at the data point Di and $$S_{i,f} = \frac{1}{(2W_s+1)^2} \sum_{(u,v) \in R_{s,i,f}} \|F(u,v)\| \text{ and}$$

$$B_{i,f} = \frac{1}{(2W_b+1)^2 - (2W_s+1)^2} \sum_{(u,v) \in R_{b,i,f}} \|F(u,v)\|.$$

It will be noted that the denominator of $B_{i,f}$ is an area defined by the area $(2W_b+1)$ of the non-data or background window $R_{b,i,f}$ minus the area $(2W_s+1)$ of the data window region $R_{s,i,f}$.

The example data bearing image pattern is formed by black and white coding such that each pixel is either a black pixel or a white pixel and the pixels. When the example data bearing image pattern is formed on a permanent carrying medium by a digital formation process, for example, digital printing, the pixels are either at a brightness coding level of 0 (black) or 255 (white). For the example authentication device, there are 55% of black pixels and 45% of white pixels.

In some embodiments, the data bearing image pattern is formed by gray scale coding of the image defining elements, such that each image defining element is coded at a brightness level selected from a plurality of available discrete brightness levels and the relative brightness levels of the constituting image defining elements cooperate to define the spatial domain characteristics of a data bearing image pattern. In example embodiments, the data bearing image pattern may be formed by gray scale coding of the image defining elements using an example of 256 quantization levels, such that an image defining element (or pixel) can have a brightness level of between 0 to 255. In the present example, level 0 is set as the lowest brightness level or darkest level and level 255 is set as the highest brightness level or brightest level.

Since the relative brightness levels of the image defining elements and their relative spatial relationships (that is, positions) define the entirety of the spatial domain characteristics of the data bearing image pattern, the brightness levels of the image defining elements are a salient image feature and may be used as a characterizing feature for characterizing a data bearing image pattern.

In example applications, an image of the target authentication device is captured by an image capturing device, for example a digital camera such as a digital camera of a smart mobile phone (or smart phone in short). A typical digital camera of a smart phone comprises image sensing elements which may be CCD (charge coupled device) or CMOS (complementary metal oxide semiconductor) sensors. The image sensed by an image sensing element is typically quantized into one of a plurality of predetermined discrete quantization levels and the totality of the image information obtained by the digital camera is stored in the memory of the smart phone as an image file, and 256 ($2^8$) is a commonly used number of discrete quantization levels.

Figure 12A:
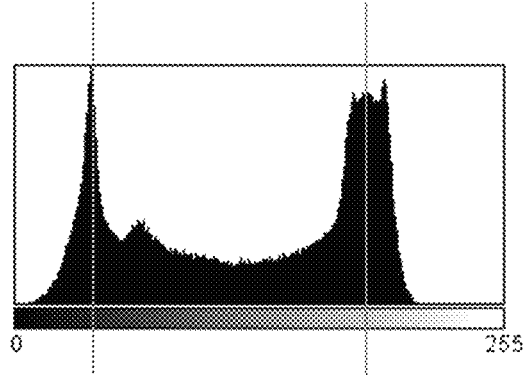
FIG. 12A is a diagram depicting brightness level distribution of pixels of a captured image of an authentic target data bearing image pattern under good illumination conditions.

While the example data bearing image pattern is binary coded in black and white, a typical captured image of the data bearing image pattern will have pixels having brightness distributed widely distributed within the quantization levels due to image capture properties of the digital camera. For example, the pixels of a properly captured image of the example target authentication device have pixels concentrated at two peaks which are near the lower limit (0) and the upper limit (255) of the quantization levels, as well as a good number of pixels distributed between the lower and upper limits, as shown in FIG. 12A. The spread in brightness levels is believed to be due to or contributed by the uneven illumination levels on the capture surface.

Figure 12B:
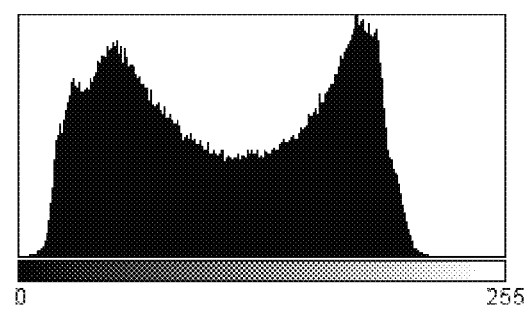
FIG. 12B is a diagram depicting brightness level distribution of pixels of a captured image of a counterfeited target data bearing image pattern under good illumination conditions.

As a comparison, a counterfeit authentication device of the example authentication device produced by a high-quality copier or printer and captured under good illumination conditions would have an example brightness level distribution as shown in FIG. 12B. It will be noted that there is a larger number of pixels having brightness levels distributed or spread between the peaks near the two extremes (0, 255) in the case of a counterfeit device.

Since the example authentication device is adequately characterized by N×M image defining elements, the image capture device is set to capture an image of the authentication device having at least N×M pixels and the captured image of the authentication device will have at least N×M pixels.

When the captured image is processed, for example, by performing Fourier Transform on the captured image pattern, the frequency domain is set to have a frequency domain unit of $$\frac{1}{N} \text{ or } \frac{1}{M}$$

line per pixel.

To determine the effects or influences or extent of effects or influences of un-even illumination or non-uniform illumination levels on the quality or fidelity of the image of a target authentication device captured at different possible locations on the capture surface CS, a plurality of images of an example authentication device which is captured while under illumination of the light emitting device of the smart phone is examined. The images, which are captured by placing a sample of the target authentication device at different relative locations with respect to the smart phone, are depicted in FIGS. 13A to 13D and FIGS. 14A to 14E. The different relative locations are different locations on the capture surface and are locations subject to different illumination conditions by the localised light emitting device 112 due to the localised or non-diffused nature of the light emitted. The different relative locations appear as different locations on the display surface 108, and two example different locations are depicted in FIGS. 3A and 3B. The different locations are at different distances and different orientations from the location of brightest illumination without loss of generality. For example, the location depicted in FIG. 3B substantially correspond to the location of FIG. 2B and substantially overlaps with the location of brightest illumination, where the light projection axis X meets the capture surface.

It has been observed that the signal quality of higher frequency pattern components is more adversely affected by non-ideal or improper exposure, that is under-exposure or over-exposure, than lower frequency pattern components. It has been further noted that the signal quality of higher frequency pattern components degrades or deteriorates more rapidly than lower frequency pattern components when illumination changes from proper illumination towards under-exposure or over-exposure.

The example authentication device used for this purpose comprises a data bearing image pattern 140A which contains only the outer circle of data having a data frequency of 200 LPI. This data frequency has been selected because this is the frequency limit or copy frequency limitation of a common-place or staple copy machine or scanner which is widely used for counterfeiting activities.

It is noted that the higher frequency components of the image pattern become barely recognizable when the brightness level of the higher frequency components reaches an upper threshold brightness level. Referring to FIGS. 13A to 13D and 13A1 to 13D1, the features of the higher frequency components of the image pattern at brightness levels of 153 of FIGS. 13A and 13A1 and 165 of FIGS. 13B and 13B1 are still substantially recognizable but become not or barely recognizable when reaching the brightness level of 173 of FIGS. 13C and 13C1. When the brightness level reaches 182 of FIGS. 13D and 13D1, which is still far from the maximum brightness level of 255, the higher frequency components become so blurred and are beyond visual recognition. As the higher frequency components become blurred or unrecognizable at 173, a brightness level of 171 is selected as an example upper brightness threshold level T2 to give a small margin. The images of the example authentication device as depicted in FIGS. 13A to 13D were captured using a smart phone having a localised light source, and the illumination by the localised light source over the image pattern is not quite uniform or even.

It is noted that the higher frequency components of the image pattern become barely recognizable when the brightness level of the higher frequency components falls to a lower threshold brightness level. Referring to FIGS. 14A to 14E and 14A1 to 14E1, the features of the higher frequency components of the image pattern at brightness levels of 77 of FIGS. 14A and 14A1 and 55 of FIGS. 14B and 14B1 are still substantially recognizable but become not or barely recognizable when reaching the brightness level of 42 of FIGS. 14C and 14C1. When the brightness level falls to 32 of FIGS. 14D and 14D1 and 25 of FIGS. 15D and 1451, which is still far from the minimum brightness level of 0, the higher frequency components become so blurred and are beyond visual recognition. As the higher frequency components become blurred or unrecognizable at a brightness level of 31, a brightness level of 41 is selected as an example lower brightness threshold level T1 to give a small margin.

It has been observed that the quality of the lower frequency components is not as much adversely affected as the higher frequency components.

The number of pixels having a brightness level above the upper threshold T2 and the number of pixels having a brightness level below the lower brightness threshold T1 are determined with reference to the signal level of the data points.

It has been observed that the signal strength of a copied authentication device is lower than the signal strength of an authentic authentication device and the drop in signal strength is believed to be introduced by the copying process, for example, due to frequency limitation of the copy machine. It has been further observed that the drop or degradation in signal strength is more noticeable for higher frequency spatial components and higher frequency data. A higher frequency data or a higher frequency component means that the data or component has higher frequency features having material frequency components at, near or above the copy frequency limit of the copy machine. Signal strength herein means the signal strength of a selected data, a plurality of selected data or all higher frequency data.

To determine an over-exposure condition, the signal strength $S_{cf}$ of a copy of the example target authentication device of FIG. 13A is measured under best illumination conditions or no illumination condition such as natural lighting conditions and obtained. The data of the example target authentication device are at 200 LPI and the signal strength $S_{au}$ of a captured image of an authentic or genuine authentication device is captured under illuminated conditions. Illuminated conditions herein means a captured image is captured under illumination by a built-in light emitting device such as the built-in light emitting device of a smart phone.

The signal strength of the captured image of the target authentication device is measured and the number or percentage of pixels above the upper brightness threshold T2 is recorded. A relationship between the measured signal strength and the number or percentage of pixels above the upper brightness threshold T2 is then obtained.

Figure 15:
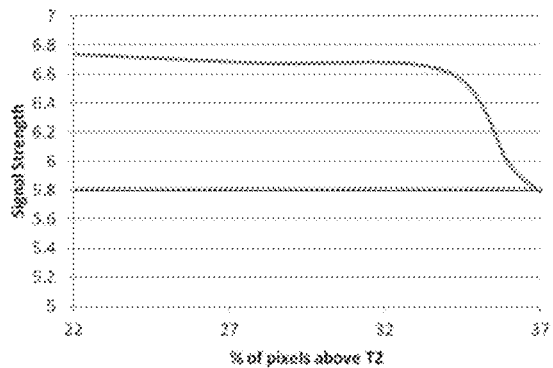
FIG. 15 is a diagram showing changes of signal strength of a captured image of an authentic authentication device versus percentage of pixels having brightness levels above T2 and signal strength of an image of a counterfeit data bearing image pattern.

As depicted in FIG. 15, the signal strength falls from an initial higher value to a signal strength value which is equal to the signal strength of the counterfeit at an upper threshold percentage. As the signal strength of the authentic or genuine authentication device and that of the counterfeit become not distinguishable at or above the upper threshold percentage, an illumination condition having an upper threshold percentage of pixels is categorised as an undesirable over-exposure condition. Referring to FIG. 15, the signal strength curve (upper curve at the signal strength axis) of the genuine authentication device having different percentage values of pixels above the threshold T2 and the signal strength of the counterfeit, which is shown in the lower curve and is substantially constant, meet at about 37%. An example upper threshold percentage of 36% is selected for this example to give an adequate margin such that a captured image having an upper threshold percentage of pixels having brightness levels above the upper threshold brightness T2 is regarded as an unacceptable or undesirable over-exposure condition.

Example signal strength values of the authentic or genuine authentication device are tabulated in Table 2 below.

TABLE 2

| | Percentage of Pixels Below lower threshold T1 | | | | |
|---|---|---|---|---|---|
| | 22 | 28 | 34 | 36 | 37 |
| Signal Strength | 6.73 | 6.67 | 6.61 | 5.97 | 5.78 |

The signal strength of the captured image of the target authentication device is measured and the number or percentage of pixels below the lower brightness threshold T1 is recorded. A relationship between the measured signal strength and the number or percentage of pixels below the lower brightness threshold T1 is then obtained.

Figure 16:
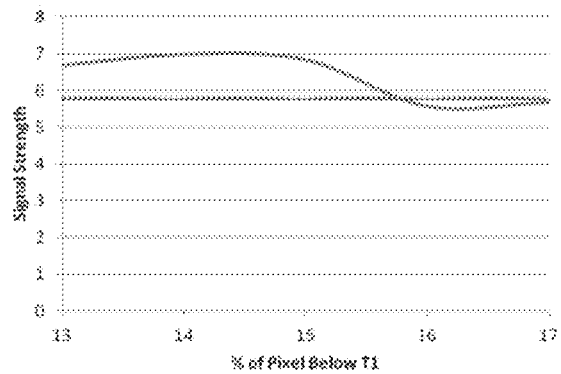
FIG. 16 is a diagram showing changes of signal strength of a captured image of an authentic authentication device versus percentage of pixels having brightness levels below T1 and signal strength of an image of a counterfeit data bearing image pattern.

As depicted in FIG. 16, the signal strength falls from an initial higher value to a signal strength value which is equal to the signal strength of the counterfeit at an upper threshold percentage. As the signal strength of the authentic or genuine authentication device and that of the counterfeit become not distinguishable at or above the upper threshold percentage, an illumination condition having an upper threshold percentage of pixels is categorised as an undesirable under-exposure condition. Referring to FIG. 16, the signal strength curve (upper curve at the signal strength axis) of the genuine authentication device having different percentage values of pixels below the threshold T1 and the signal strength of the counterfeit, which is shown in the lower curve and is substantially constant, meet at about 15%. An example upper threshold percentage of 15% is selected for this example to give an adequate margin such that a captured image having an upper threshold percentage of pixels having brightness levels below the lower threshold brightness T1 is regarded as an unacceptable or undesirable under-exposure condition. For the example authentication device, the counterfeit has a signal strength of about 5.8 while the authentic device under good illumination conditions has a signal strength of approaching 7.

Example signal strength values of the authentic or genuine authentication device are tabulated in Table 3 below.

TABLE 3

| | Percentage of Pixels Below lower threshold T1 | | | | |
|---|---|---|---|---|---|
| | 13 | 14 | 15 | 16 | 17 |
| Signal Strength | 6.69 | 6.99 | 6.85 | 5.58 | 5.69 |

In the example of FIGS. 15 and 16, the signal strength values are obtained by averaging a plurality of the K smallest values of $S_i(f)$, and K is selected as 4 as a convenient example.

It would be appreciated that signal strength herein is defined by the difference between the magnitude of a data point and the average of the magnitude of the background surrounding the data point. Signal strength herein is standardized with respect to the magnitude of the background points and is independent of the range of the overall brightness of the captured image of the authentication device, while magnitude in itself is dependent on brightness parameters of the image capture device.

A general equation for the averaged signal strength $S(u, v)$ is shown below:

$$S(u, v) = \frac{1}{K} \times \sum_{u,v} \frac{\|F(u, v)\| - Mn}{SD}$$

where $$Mn = \text{mean} = \frac{\sum_{(u',v') \in P} \|F(u', v')\|}{\left(\frac{f}{10} \times 2 + 1\right)^2 - 1},$$

$$SD = \text{standard deviation} = \sqrt{\frac{\sum_{(u',v') \in P} (\|F(u', v')\| - M)^2}{\left(\frac{f}{10} \times 2 + 1\right)^2 - 1}},$$

P is the set of data points in the window region and f represents the data frequency of (u, v) in LPI.

When a captured image has a percentage of pixels having brightness levels above T2 but not exceeding a first upper percentage threshold and a percentage of pixels having a brightness level below T1 but not exceeding a second upper percentage, due or proper exposure conditions are met or assumed.

In order to prepare the image capture apparatus 100 for capturing an image of a target authentication device so that a captured image resulting from operating the image capture apparatus 100 would satisfy the quantity and quality (or fidelity) requirements of a duly captured data bearing image pattern of a target authentication device, a calibration process is performed on a reference image capture apparatus which is representative of the image capture apparatus 100. In general, the reference image capture apparatus and the image capture apparatus 100 have an identical or share a common technical specification. In some embodiments, the reference image capture apparatus and the image capture apparatus 100 have the same or identical technical specification in so far as the light emitting device, the image capture device and their inter-relationship are concerned. In some embodiments, the reference image capture apparatus and the image capture apparatus 100 have display surface of the same technical specification in addition to identical specification on the light emitting device, the image capture device and their inter-relationship.

When performing calibration, a reference pattern (also referred to as a calibration sample), for example a sample of the data bearing image pattern, is placed at different locations on the capture surface of the reference image capture apparatus and a location or a plurality of locations which would give rise to an acceptable distribution of pixel brightness levels is recorded, for example, for subsequent use or selection. In some embodiments, the reference pattern may be or a sample of the target authentication device.

In some embodiments, a plurality of the reference patterns is placed on the capture surface of the reference image capture apparatus and a location or a plurality of locations which would give rise to an acceptable distribution of pixel brightness levels is recorded, for example, for subsequent use or selection.

In some embodiments, a plurality of the reference patterns which completely fills the capture surface (and the display surface) is placed on the capture surface and a location or a plurality of locations which would give rise to an acceptable distribution of pixel brightness levels is recorded, for example, for subsequent use or selection.

In some embodiments, a plurality of the data bearing image pattern which completely fills the capture surface (and the display surface) is placed on the capture surface and a location or a plurality of locations which would give rise to an acceptable distribution of pixel brightness levels is recorded, for example, for subsequent use or selection.

Figure 17:
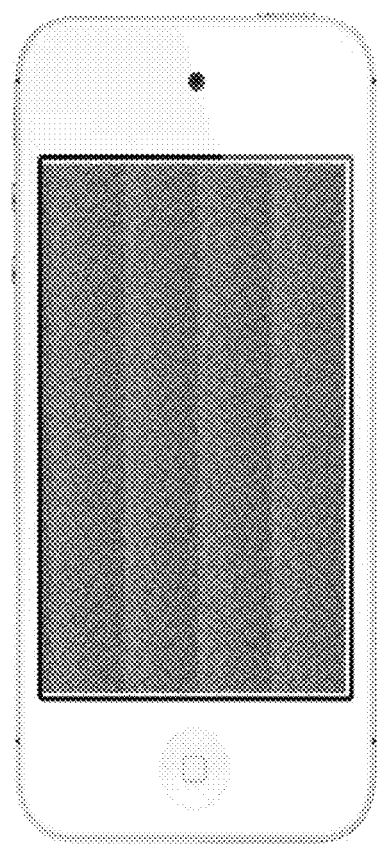
FIG. 17 shows an example calibration sheet of filled with reference data bearing image pattern and appearing on the display of an example calibration apparatus.

In example calibration embodiments, a calibration sheet filled with a plurality of the reference patterns is placed on the capture surface and the plurality of reference patterns fills up the entire display surface when an image of the calibration sample is taken, as depicted in FIG. 17. An example calibration sheet is filled with the reference patterns such that identical reference patterns are placed side by side, in abutment contact, and/or continuously with no gap between adjacent reference patterns.

In example calibration embodiments, the brightness levels of the individual pixels are recorded and areas or regions which meet acceptable illumination requirements are recorded for subsequent use or selection.

An acceptable illumination requirement may be one selected as one in which all the pixels of the captured image of the have brightness levels between T1 and T2.

An acceptable illumination requirement may be selected as one in which the number of pixels having brightness levels exceeding an upper brightness threshold T2 does not exceed a predetermined upper threshold.

An acceptable illumination requirement may be selected as one in which the number of pixels having brightness levels below an lower brightness threshold T1 does not exceed a predetermined upper threshold.

When performing calibrations, the light emitting device is operated when the image capture device is in operation to provide illumination to cover the entire capture surface.

In performing calibration, a calibration sheet as used in the example of FIG. 17 may be used and regions having brightness levels above T2 and/or having brightness levels below T1 are avoided or marked to be avoided. Regions or locations which are between the threshold brightness levels T1 and T2 may be recorded and selected for use. Where there is no region or location on the capture surface or the display surface in which all pixels have brightness levels which are within an acceptable brightness window defined between T1 and T2, a region or location comprising pixels having brightness levels above T2 and/or T1 may be selected, provided that the number or percent of pixels having brightness levels above T2 does not exceed a pre-determined first threshold count or threshold percentage and the number or percent of pixels having brightness levels below T1 does not exceed a pre-determined second threshold count or threshold percentage.

When performing calibration, the signal strength of a selected data, a plurality of data or the set of data may also be obtained. The obtained signal strength may be used to determine acceptability of an acceptable location. For example, where a location has been selected, the data strength of the data obtained from the selected region will be compared to the data strength of a counterfeit data bearing pattern and a region which gives rise to a higher data strength than that of the counterfeit data bearing pattern will be selected.

After calibration has been performed and done, the selected location will be recorded and implemented in the App. The App will devise an alignment guide which is to appear on the display surface of the image capture apparatus. The alignment guide is set such that when an image of the target authentication device is fully aligned with the alignment guide on the display surface, the light emitting device and the target authentication device is at a prescribed relative location having the predetermined acceptable illumination requirements. Since the display surface can accommodate or display a plurality of target authentication devices, the alignment guide corresponds to a selected one of a plurality of relative locations available between the target authentication devices and the light emitting device. The relative location is at a predetermined distance and orientation from the location of brightness illumination on the capture surface.

When the App is loaded in a smart phone or other mobile apparatus, the smart phone or other mobile apparatus will operate as an image capture apparatus 100 as described herein. In some embodiments, the App may further set up and operate the smart phone or the mobile apparatus as an authentication apparatus without loss of generality.

Where a smart phone or mobile apparatus is set to operate as an image capture apparatus or an authentication apparatus, additional measures may be performed to examine images which might have been captured as a result of automatic re-metering of brightness levels.

For example, brightness conditions on a captured image may be examined to identify non-symmetrical brightness on an image of axis symmetrical data bearing image pattern, such as that of FIGS. 10A, 10C and 10D.

In some embodiments, brightness levels on left and right half-sides of a captured image may be compared to identify lateral imbalance in brightness. If the brightness imbalance exceeds a predetermined threshold, the captured image may be rejected.

In some embodiments, brightness levels on upper and lower halves of a captured image may be compared to identify imbalance in brightness. If the brightness imbalance exceeds a predetermined threshold, the captured image may be rejected.

In some embodiments, brightness levels on inner and outer halves of a captured image may be compared to identify imbalance in brightness. If the brightness imbalance exceeds a predetermined threshold, the captured image may be rejected.

Therefore, where the data bearing image pattern is axis symmetrical, for example, axis symmetrical about the center of the data bearing image pattern, additional illumination parameters may be used to promote fidelity of captured image.

The alignment device comprises a plurality of alignment marks on corners of the authentication device. In example embodiments and for sake of understanding the present disclosure, the alignment marks can be considered as located outside the data bearing image pattern and the N×M pixels are all image defining elements of the data bearing image pattern.

While the authentication methods and apparatus and calibration methods and apparatus have been described with reference to the above examples and embodiments, it should be appreciated that the examples and embodiments are only to assist understanding and shall not be used to limit the scope of disclosure. For example, while the example authentication processes have been illustrated with reference to operation on a smart phone, it should be appreciated that other portable or mobile electronic devices such as tablet computers or dedicated verification apparatus can be used without loss of generality. As another example, the display may be built-in on the authentication apparatus or can be an external display.

The invention claimed is:

1. A method of devising an apparatus as an authentication apparatus for capturing an image of an authentication device for verification of authenticity, the apparatus comprising an image capturing device, a light emitting device for projecting supplemental illumination along an axis of light projection to a target authentication device during image capture operations when supplemental illumination is required, a display device having a display screen, a data storage and a processor;
   wherein the authentication device comprises a data bearing image pattern which is characterized by a plurality of pattern defining elements, wherein the pattern defining elements are digitally coded and spatially distributed according to a spatial distribution scheme to embed one data or a set of data comprising a plurality of data as a security feature, and wherein the spatial distribution pattern and the security feature are correlated by a coding scheme;
   wherein the method comprises:
      using a reference apparatus to determine brightness levels of pixels of sample images of a reference authentication device at a plurality of available relative positions between an image capturing device of the reference apparatus and the reference authentication device while the reference authentication device is under supplemental illumination of a light emitting device of the reference apparatus and storing the sample images as pixel data; wherein the plurality of available relative positions includes at least an acceptable relative position which meets a pixel brightness level requirement and a plurality of unacceptable relative positions which does not meet the pixel brightness level requirement;
      analyzing pixel brightness levels of the pixel data at the plurality of available relative positions,
      identifying an acceptable relative position which meet the pixel brightness level requirement from the plurality of available relative positions, and selecting the acceptable relative position as a target relative position;
      storing the target relative position in stored instructions of an authentication process;
   wherein the processor of the apparatus is to devise a visual guide on a selected portion of the display screen to correspond to the target relative position upon execution of the stored instructions of the authentication process;
   wherein the visual guide is configured to provide alignment guidance to assist a user to operate the apparatus to capture an image of the target authentication device such that a captured image of the target authentication device captured following the guidance of the visual guide and under the supplemental illumination is an image having a pixel data quantity which meets a pixel data quantity requirement and having a pixel data quality which meets the pixel brightness level requirement to facilitate verification of authenticity of the target authentication device.

2. The method of claim 1, wherein the pixel brightness level requirement is satisfied if the quantity of the pixel data of the captured image of the target authentication device exceeding an overexposure threshold is not greater than a first threshold count, and the quantity of the pixel data of the captured image of the target authentication device below an underexposure threshold is not greater than a second threshold count; and wherein an available relative position which does not meet the pixel brightness level requirement is not selected as the target relative position for capturing the image of the authentication device for verification of authenticity of the authentication device.

3. The method of claim 1, wherein the method comprises selecting an available relative position such that the axis of light projection of the supplemental illumination falls outside the security feature of the authentication device to devise the visual guide.

4. The method of claim 2, wherein the method comprises selecting an available relative position which has a more even distribution of supplemental illumination brightness on the authentication device as the target relative position where there is a plurality of available relative positions satisfying the pixel brightness level requirement.

5. The method of claim 1, wherein the method comprises not selecting an available relative position where the target authentication device intercepts the axis of light projection of the supplemental illumination as the target relative position.

6. The method of claim 1, wherein the method comprises recording the brightness levels of the pixels of the captured image of the reference authentication devices at areas or regions corresponding to the plurality of available relative positions for subsequent selection of the target relative position.

7. The method of claim 6, wherein the method comprises not selecting an area or a region for subsequent selection of the target relative position, if the number of pixels of a captured image of the reference authentication at the area or the region having a brightness level above an upper brightness threshold exceeds a first threshold count.

8. The method of claim 6, wherein the method comprises not selecting an area or a region for subsequent selection of the target relative position, if the number of pixels of a captured image of the reference authentication at the area or the region having a brightness level below an upper brightness threshold exceeds a second threshold count.

9. The method of claim 1, wherein the method comprises capturing an image of the reference authentication device at the plurality of available relative positions to form a plurality of captured images, analyzing pixel brightness levels of the pixels of the plurality of captured images to identify a relative position suitable for devising the visual guide, and selecting the relative position as a suitable relative position for devising the target relative position if the pixel brightness levels of the pixels of the captured image taken at the relative position meet the pixel brightness level requirement.

10. The method of claim 1, wherein the method comprises capturing an image of a calibration sheet to form a captured calibration sheet image, storing and analyzing pixel brightness levels of the pixels of the captured calibration sheet image to identify areas or regions which meet the pixel brightness level requirement for subsequent selection of the target relative position, wherein the captured calibration sheet image comprises a plurality of the authentication device which are placed side-by-side and in abutment.

11. The method of claim 10, wherein the method comprises devising the calibration sheet such that the display surface of the display screen of the reference apparatus is filled by a plurality of the data bearing image patterns of the authentication device, and the data bearing image patterns are placed side-by-side and in abutment.

12. The method of claim 1, wherein the apparatus is a smartphone having an elongate main housing extending along a longitudinal axis and a built-in light emitting device, and the axis of light projection is at an acute angle to the longitudinal axis, and wherein the method comprises selecting an available relative position such that the authentication device does not intercept the axis of light projection to devise the visual guide.

13. The method of claim 1, wherein the security feature is coded using a domain transformation coding scheme and the pattern defining elements are arranged in groups of pixels to form a plurality of sub-patterns to define a set of discrete data, wherein each discrete data comprises a frequency component and an angular component, and wherein adjacent discrete data of same frequency are separated by an angle.

14. The method of claim 1, wherein the data embedded in the pattern defining elements has a characteristic signal strength, and wherein the method comprises measuring signal strengths of the data embedded in the target authentication device at the plurality of available relative positions to obtain measured signal strengths, comparing the measured signal strengths with the signal strength of a copied target authentication device, and selecting an unavailable relative position giving a measured signal strength higher than the signal strength of a copied target authentication device as the target relative position.

15. An authentication apparatus for capturing an image of a target authentication device for verification of authenticity of the target authentication device,
wherein the target authentication device comprises a data bearing image pattern which is characterized by a plurality of pattern defining elements, wherein the pattern defining elements are digitally coded and spatially distributed according to a spatial distribution scheme to embed one data or a set of data comprising a plurality of data as a security feature, and wherein the spatial distribution pattern and the security feature are correlated by a coding scheme;
wherein the authentication apparatus comprises an image capturing device for capturing an image of the target authentication device when the target authentication device is on a capture surface which is at a capture distance from the authentication apparatus, a light emitting device for projecting supplemental illumination along an axis of light projection and towards the target authentication device during image capture operations when supplemental illumination is required or activated, a display device including a display screen having a display surface, and a processor;
wherein the processor is configured to devise a visual guide on a preselected display region of the display screen on execution of stored instructions of an authentication process, the preselected display region corresponding to a target relative position between the image capturing device and the target authentication device;
wherein the visual guide is configured to provide alignment guidance to assist a user to position the image capturing device at the target relative position to the target authentication device such that an image of the target authentication device captured following the alignment guidance of the visual guide while under the supplemental illumination is a captured image having a pixel data quantity which meets a pixel data quantity requirement and a pixel data quality which meets a pixel data quality requirement to facilitate verification of authenticity of the target authentication device;
wherein the target relative position is one of a plurality of available relative positions between the image capturing device and the target authentication device which permit capture of an image of the target authentication device meeting the pixel data quantity requirement;
wherein the plurality of available relative positions includes a plurality of unacceptable relative positions such that the pixels of an image of the target authentication device captured at an unacceptable relative position while under the supplementary illumination has underexposure and/or overexposure problems and does not meet a pixel brightness level requirement; and
wherein the target relative position is an acceptable relative position preselected from the plurality of available relative positions such that an image of the target authentication device captured at the target relative position while under the supplementary illumination has pixels which meet the pixel brightness level requirement to facilitate verification of the target authentication device.

16. The authentication apparatus of claim 15, wherein the authentication apparatus is configured to execute the stored instructions of the authentication process to capture the image of the target authentication device at the target relative position to facilitate verification of the target authentication device;
wherein the target relative position is determined in a calibration process, wherein brightness levels of pixels of an image of the authentication device at the plurality of available relative positions between the image capturing device and the target authentication device are analyzed, and an acceptable relative position which meets the pixel brightness level requirement is selected as the target relative position and stored in the instructions of the authentication process.

17. The authentication apparatus of claim 16, wherein the target relative position is determined in the calibration process using a calibration apparatus and a calibration sample of the authentication device, the calibration sample having the data bearing image pattern or a plurality of the data bearing image patterns of the target authentication device.

18. The authentication apparatus of claim 15, wherein the processor is configured to devise the visual guide which is to preset a relative position between the image capturing device and the target authentication device to facilitate capture of the image of the target authentication device at the target relative position meeting the pixel data quantity requirement and the pixel brightness level requirement; wherein the pixel brightness level requirement is satisfied if the quantity of the pixel data of a captured image of the authentication device exceeding an overexposure threshold is not greater than a first threshold count, and the quantity of the pixel data of the captured image of the authentication device below an underexposure threshold is not greater than a second threshold count.

19. The authentication apparatus of claim 18, wherein the authentication apparatus is a smartphone configured to execute the stored instructions of the authentication process and having a built-in light emitting device, wherein the authentication apparatus has an elongate housing extending along a longitudinal axis, and the built-in light emitting device is configured to project the supplemental illumination at an acute angle to the longitudinal axis, wherein the location of the visual guide on the display screen is preset at the target relative position before execution of the authentication process, and the target relative position is preselected from the plurality of available relative positions which includes the target relative position and the plurality of unacceptable relative positions; and wherein the visual guide is preset such that an image of the target authentication device aligned with the visual guide and captured by the smartphone while under the supplemental illumination has pixel brightness levels within a predetermined range of pixel brightness distribution characteristics and meeting a quality of fidelity sufficient to facilitate verification of authenticity.

20. The authentication apparatus of claim 19, wherein the stored instructions are apparatus specific and the target relative position is preset according to specific smartphone models.

* * * * *